United States Patent
Legum et al.

(10) Patent No.: US 12,162,197 B2
(45) Date of Patent: Dec. 10, 2024

(54) RECONFIGURABLE MOLD AND MOLDING SUBSYSTEM FOR INJECTION MOLDING AND THREE-DIMENSIONAL ADDITIVE MANUFACTURING APPLICATIONS

(71) Applicant: Muse Engine, LLC, New Orleans, LA (US)

(72) Inventors: Benjamin Morgan Legum, Bluemont, VA (US); Jennifer Louise Vondran, Hopewell, NJ (US); Jody Allen Strausser, Clarion, PA (US)

(73) Assignee: MUSE ENGINE, LLC, New Orleans, LA (US)

( * ) Notice: Subject to any disclaimer, the term of this patent is extended or adjusted under 35 U.S.C. 154(b) by 0 days.

(21) Appl. No.: 17/749,950

(22) Filed: May 20, 2022

(65) Prior Publication Data

US 2022/0371244 A1    Nov. 24, 2022

Related U.S. Application Data

(60) Provisional application No. 63/191,659, filed on May 21, 2021.

(51) Int. Cl.
  *B29C 33/30*    (2006.01)
  *B29C 45/37*    (2006.01)
  (Continued)

(52) U.S. Cl.
  CPC .......... *B29C 45/376* (2013.01); *B29C 64/20* (2017.08); *B33Y 30/00* (2014.12)

(58) Field of Classification Search
  CPC ..... B29C 45/376; B29C 33/308; B29C 33/30; B29C 33/301; B29C 33/302; B29C 33/32;
  (Continued)

(56) References Cited

U.S. PATENT DOCUMENTS 3,854,859 A    12/1974   Sola
5,151,277 A     9/1992   Bernardon et al.
(Continued)

FOREIGN PATENT DOCUMENTS

CA    2894983 C    9/2015
CN    203621219 U   6/2014
(Continued)

OTHER PUBLICATIONS

Korean Intellectual Property Office, International Search Report and Written Opinion issued in corresponding Application No. PCT/US2022/030331, mailed Sep. 15, 2022.
(Continued)

*Primary Examiner* — Galen H Hauth
*Assistant Examiner* — Baileigh Kate Darnell
(74) *Attorney, Agent, or Firm* — Stites & Harbison, PLLC; Gary N. Stewart

(57) ABSTRACT

A molding subsystem includes a reconfigurable mold and a control subsystem. The reconfigurable mold includes one or more plates, with each plate including: a plurality of pins defining a molding surface of the reconfigurable mold; a frame which defines a plurality of channels for receiving the plurality of pins; and a plurality of actuators for moving the plurality of pins in a first axial direction. The control subsystem includes a controller operably connected to the plurality of actuators of each plate, such that the controller can communicate instructions to and/or obtain readings therefrom. The molding surface of each plate can be manipulated in response to pin movement to facilitate the manufacture of articles of different shape and dimension. Output data corresponding to a digital model of an article placed in the reconfigurable mold can be generated based on readings obtained by the plurality of actuators of each plate.

16 Claims, 18 Drawing Sheets

(51) Int. Cl.
   *B29C 64/20* (2017.01)
   *B33Y 30/00* (2015.01)
(58) Field of Classification Search
   CPC ......... B29C 64/20; B29C 51/18; B29C 51/30; B33Y 30/00
   See application file for complete search history.

(56) References Cited

U.S. PATENT DOCUMENTS

| | | | |
|---|---|---|---|
| 5,330,343 | A | 7/1994 | Berteau |
| 5,513,972 | A | 5/1996 | Schroeder et al. |
| 5,546,784 | A | 8/1996 | Haas et al. |
| 5,738,345 | A | 4/1998 | Schroeder et al. |
| 5,796,620 | A * | 8/1998 | Laskowski ......... G05B 19/4207 700/118 |
| 5,846,464 | A | 12/1998 | Hoffman |
| 5,851,563 | A | 12/1998 | Hoffman |
| 5,914,081 | A | 6/1999 | Shevchuk |
| 6,012,314 | A | 1/2000 | Sullivan et al. |
| 6,354,561 | B1 | 3/2002 | Fahrion |
| 6,484,776 | B1 | 11/2002 | Meilunas et al. |
| 6,847,915 | B2 | 1/2005 | Liang et al. |
| 7,159,836 | B2 | 1/2007 | Parks et al. |
| 7,625,199 | B2 | 12/2009 | Jahn et al. |
| 7,997,891 | B2 | 8/2011 | Gallagher et al. |
| 8,510,924 | B2 | 8/2013 | Mankame et al. |
| 8,956,145 | B2 | 2/2015 | Johnson et al. |
| 8,998,652 | B2 | 4/2015 | Martineau |
| 9,539,739 | B2 | 1/2017 | Ruthrauff |
| 9,552,915 | B2 | 1/2017 | Khan et al. |
| 9,664,265 | B2 | 5/2017 | Peters |
| 10,245,775 | B2 | 4/2019 | Geshlider et al. |
| 10,471,667 | B2 | 11/2019 | Siagam et al. |
| 10,603,835 | B2 | 3/2020 | Hall et al. |
| 2002/0050672 | A1* | 5/2002 | Moncavage ......... B23Q 1/035 269/266 |
| 2004/0159974 | A1 | 8/2004 | Fischer |
| 2006/0151930 | A1* | 7/2006 | Moncavage ......... B25B 1/2421 269/266 |
| 2008/0302500 | A1 | 12/2008 | Winkler |
| 2012/0279812 | A1 | 11/2012 | Peters |
| 2014/0170870 | A1* | 6/2014 | Martineau ......... A63F 13/98 439/131 |
| 2015/0248960 | A1* | 9/2015 | Khan ......... H01F 7/064 361/143 |
| 2018/0015524 | A1* | 1/2018 | Gomari ......... B21D 22/02 |
| 2018/0222107 | A1* | 8/2018 | Hall ......... B29C 51/30 |
| 2019/0118426 | A1* | 4/2019 | Larsson ......... B29C 43/10 |

FOREIGN PATENT DOCUMENTS

| | | |
|---|---|---|
| DE | 102011006980 A1 | 10/2012 |
| DE | 102011055239 A1 | 2/2015 |
| FR | 2548577 A1 | 1/1985 |
| JP | 2005055767 A | 3/2005 |
| JP | 2005205851 A | 8/2005 |
| KR | 100780804 B1 | 11/2007 |
| WO | 1997010090 A1 | 3/1997 |
| WO | 0229504 A1 | 4/2002 |
| WO | 2011034434 A1 | 3/2011 |
| WO | 2012064446 A2 | 5/2012 |
| WO | 2017153319 A1 | 9/2017 |

OTHER PUBLICATIONS

Peters, Benjamin, J. "Practical Pin Tooling," Dissertation, Massachusetts Institute of Technology, 2013.
Wright, I. "Could Dynamic Molding Be Bigger than 3D Printing?" www.engineering.com posted Aug. 22, 2016.
Pinpress. "Shape-shifting tool that gives you a thousand molds in one," angel.com/company/pinpress downloaded Aug. 9, 2020.
Volkel, T., et al. "Tactile Graphics Revised: The Novel BrailleDis 9000 Pin-Matrix Device with Multitouch Input," Springer-Verlag Berlin Heidelberg, 2008, pp. 835-842.
Khan, A. "Towards Microfluidic Design Automation," Thesis, University of Waterloo, Waterloo, Ontario, Canada, 2016.
Cook, N.J., et al. "A Novel Multipin Positioning System for the Generation of High-Resolution 3-D Profiles by Pin-Arrays," IEEE Transactions on Automation Science and Engineering, vol. 5, No. 2, 2008, pp. 216-222.
Koc, B., et al. "Design and analysis of a reconfigurable discrete pin tooling system for molding of three-dimensional free-form objects," Faculty of Engineering and Natural Sciences, Sabanci University Orhanli, Tuzla, Istanbul, Turkey, 2010.

* cited by examiner

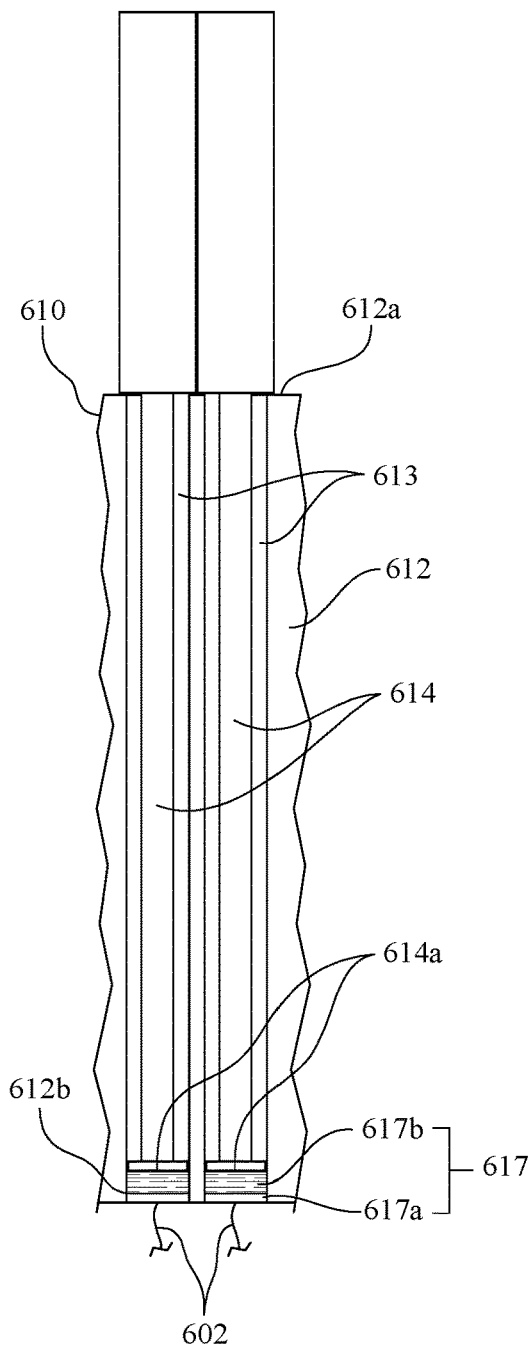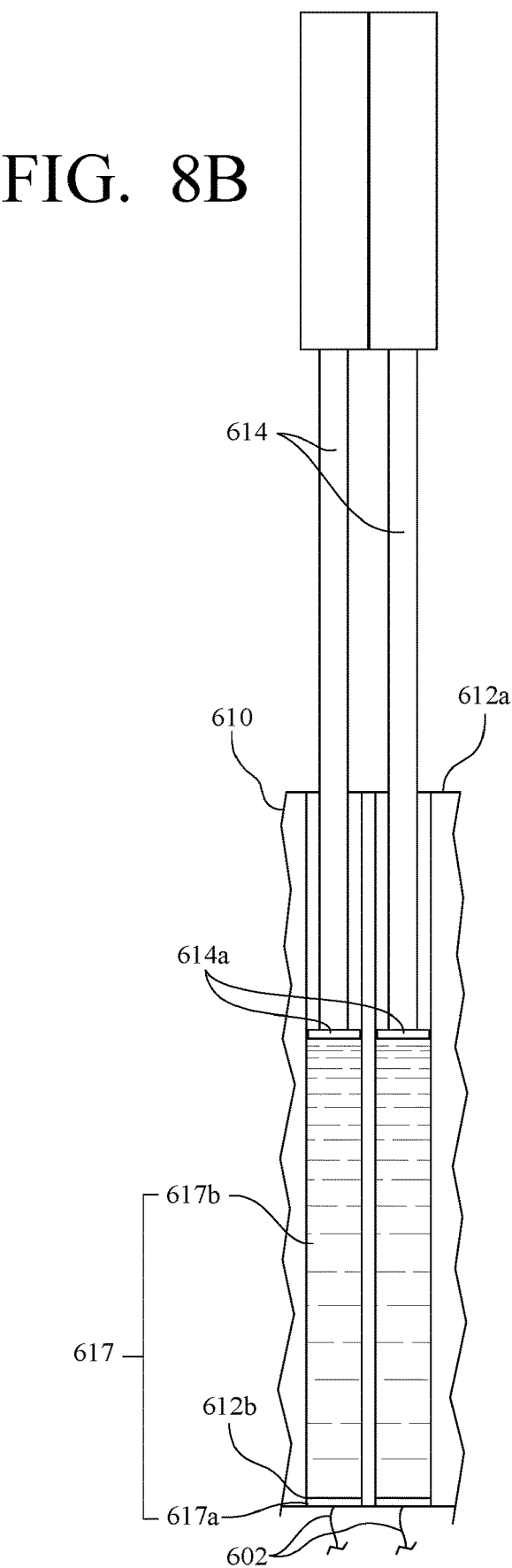
FIG. 8A
FIG. 8B

RECONFIGURABLE MOLD AND MOLDING SUBSYSTEM FOR INJECTION MOLDING AND THREE-DIMENSIONAL ADDITIVE MANUFACTURING APPLICATIONS

CROSS-REFERENCE TO RELATED APPLICATIONS

The present application claims priority to U.S. Patent Application Ser. No. 63/191,659 filed on May 21, 2021, the entire disclosure of which is incorporated herein by reference.

BACKGROUND OF THE INVENTION

The presently-disclosed subject matter relates to a molding subsystem which includes a reconfigurable mold, and which can be implemented within an injection molding system to facilitate the rapid manufacturing of different parts without the need for multiple premade molds or casts.

Injection molding is a common manufacturing technique that allows for the reproducible, reliable production of large quantities of parts. Injection molding systems are optimal for producing a large quantity of standardized parts through molten resin injected into cavities etched into a static mold system. Injection molding systems often require a large system footprint, utilize a single material, and require that the part(s) (often embodied in the format of a computer-aided design (CAD)) be adapted to a cavity within a static mold. The development of static molds for injection molding can thus be costly and time consuming.

Alternatively, additive manufacturing refers to technologies that construct three-dimensional (3D) objects one layer at a time via an additive process in which successive layers of material are laid down to compose different shapes. Three-dimensional (3D) printing, a form of additive manufacturing, offers systems with small system footprints, allows manufacturers to develop objects using a digital file, and allows for the ability to integrate various printing materials within a single run. The use of 3D printing involves the layer-by-layer addition of material to form an object referring to a three-dimensional computer aided design (CAD) file with the help of software and a three-dimensional printer to deposit the layers. The materials used in injection molding and additive manufacturing can include polymers, metals, ceramics, or combination thereof. Although additive manufacturing can be used to quickly manufacture geometrically complex parts and prototypes with little tooling, the resolution and throughput limitations of 3D printing render the process unfitting for applications requiring manufacture at high production volumes.

Accordingly, a need remains in the art for devices and systems which address the shortcomings of the above-described manufacturing techniques and systems.

SUMMARY OF THE INVENTION

The present invention is a molding subsystem which includes a reconfigurable mold, and which can be implemented within an injection molding system to facilitate the rapid manufacturing of different parts without the need for multiple premade molds or casts.

An exemplary molding subsystem made in accordance with the present invention includes a reconfigurable mold and a control subsystem. The reconfigurable mold includes one or more plates, with each plate including: a plurality of pins defining a molding surface of the reconfigurable mold; a frame which defines a plurality of channels for receiving the plurality of pins; and a plurality of actuators, where each actuator corresponds to, and can be selectively activated to move, at least one pin of the plurality of pins in the first axial direction to affect the shape of the molding surface. The control subsystem includes a controller which is operably connected to the plurality of actuators of each plate, such that the controller can communicate instructions to and/or obtain readings from the respective actuator of each plate in the reconfigurable mold.

In some embodiments, the controller includes a processor for executing instructions stored in a memory component to receive and process input data (e.g., a computer-aided-design file, such as a .stl file) corresponding to a digital model for an article intended for manufacture and communicate instructions which activate select actuators of each plate based on the input data received. Activation of select actuators of each plate causes the pins corresponding thereto to move in the first axial direction in a manner which causes the molding surface of each plate to assume a shape which defines, at least partially, a cavity corresponding to the article intended for manufacture, and in which resin emitted from a resin injection assembly can be received to form the article. Following the formation of one article, the plurality of pins of each plate can be repositioned in the first axial direction in response to the controller receiving and processing new input data to facilitate the molding of another article of different shape and/or dimension. In this way, the reconfigurable mold can thus serve to eliminate or reduce the need for multiple static molds and the cost and downtime associated therewith.

In some embodiments, each actuator of the plurality of actuators of each plate is an electromagnetic actuator and a base of each pin of the plurality of pins of each plate is constructed of a magnetic material. In one such embodiment, each actuator of the plurality of actuators of each plate is a solenoid including one or more wound coils. In some embodiments, each wound coil is configured to receive the base of a single pin and to receive an electrical current to move the pin in the first axial direction. In some embodiments, the frame of each plate includes multiple platforms which collectively define the plurality of channels in which the plurality of pins of the plate are received. In one such embodiment, each actuator includes multiple wound coils that are attached to different platforms of the frame.

In some embodiments, each actuator of the plurality of actuators of each plate includes a thermally expandable material deposited within a channel of the plurality of channels, and each actuator of the plurality of actuators is activated by heating the thermally expandable material.

In some embodiments, each actuator of the plurality of actuators of each plate includes an airflow source in fluid communication with a channel of the plurality of channels, and an articulable arm configured to regulate the flow of air into or out of the channel, wherein each actuator of the plurality of actuators is activated by activating the airflow source and repositioning the articulable arm.

In some embodiments, the molding subsystem further includes a locking mechanism for each plate of the reconfigurable mold, which can be selectively activated to move the plurality of pins of the plate in at least one of a second axial direction and a third axial direction and to hold the plurality of pins in a fixed position within the plurality of channels. In such embodiments, the second axial direction and the third axial direction are perpendicular to each other and to the first axial direction. In such embodiments, a base of each pin of the plurality of pins of each plate is received in one of the plurality of channels of the plate, and the base of each pin has a diameter which is smaller than a diameter of the channel in which the pin is received, such that the pin can be repositioned within the channel in at least one of the second axial direction and the third axial direction in response to the locking mechanism being activated. In one such embodiment, a head of each pin of the plurality of pins of each plate is in contact with the head of at least one other pin of the plurality of pins of the plate. In another embodiment, the head of each pin of the plurality of pins of each plate is in contact with the head of at least two other pins of the plurality of pins of the plate.

In some embodiments, the locking mechanism for each plate of the reconfigurable mold includes: a first locking mechanism, which can be selectively activated to move the plurality of pins of the plate in the second axial direction; and a second locking mechanism, which can be selectively activated to move the plurality of pins of the plate in a third axial direction. In some embodiments, the first locking mechanism includes a first bar positioned adjacent to a first row of pins of the plurality of pins and configured to be driven in the second axial direction in response to rotation of a first shaft, and the second locking mechanism includes a second bar positioned adjacent to a second row of pins of the plurality of pins and configured to be driven in the third axial direction in response to rotation of a second shaft. In one such embodiment, the first locking mechanism includes a first motor, which can be selectively activated to rotate the first shaft, and the second locking mechanism includes a second motor which can be selectively activated to rotate the second shaft. In some embodiments, the first motor and the second motor are operably connected to the controller, and the processor is configured to execute instructions stored in the memory component to activate the first motor and the second motor.

In some embodiments, the first locking mechanism includes a first set of bars configured to be driven in the second axial direction in response to rotation of a first set of shafts, with each bar of the first set of bars being positioned adjacent to a subset of pins within a first row of pins of the plurality of pins. The second locking mechanism can, in some embodiments, similarly include a second set of bars configured to be driven in the third axial direction in response to rotation of a second set of shafts, with each bar of the first set of bars being positioned adjacent to a subset of pins within a second row of pins of the plurality of pins. In some embodiments, the first locking mechanism includes a first electromagnet positioned adjacent to a first row of pins of the plurality of pins and configured to be selectively activated to generate an electromagnetic field to move the first row of pins in the second axial direction, and the second locking mechanism includes a second electromagnet positioned adjacent to a second row of pins of the plurality of pins and configured to be selectively activated to generate an electromagnetic field to move the second row of pins in the third axial direction. In one such embodiment, the first electromagnet and the second electromagnet are operably connected to the controller, and the processer is configured to execute instructions stored in the memory component to communicate instructions which activate the first electromagnet and communicate instructions which activate the second electromagnet.

In some embodiments, the reconfigurable mold includes a first plate and a second plate. In one such embodiment, the molding subsystem further includes a framework for supporting the first plate and the second plate opposite of each other, with the framework including a guide rail to which at least one of the first plate and the second plate is mounted for travel. In one such embodiment, a plate actuator is operably connected to the controller and mounted to at least one of the first plate and the second plate, and the processor of the controller is configured to execute instructions stored in the memory component to communicate instructions which cause the plate actuator to move the first plate and the second plate toward each other and communicate instructions which cause the plate actuator to move the first plate and the second plate away from each other.

In some embodiments, the molding subsystem further includes: a first membrane dispensing assembly configured to dispense a first flexible membrane configured to cover the molding surface of the first plate, with the first membrane dispensing assembly including a first pair of motorized spools for dispensing the first flexible membrane; and a second membrane dispensing assembly configured to dispense a second flexible membrane configured to cover the molding surface of the second plate, with the second membrane dispensing assembly including a second pair of motorized spools for dispensing the second flexible membrane. In such embodiment, the first pair of motorized spools and the second pair of motorized spools are operably connected to the controller, and the processor of the controller is configured to execute instructions stored in the memory component to communicate instructions which drive rotation of the first pair of motorized spools and communicate instructions which drive rotation of the second pair of motorized spools. In some embodiments, the processor is configured to execute instructions stored in the memory component to receive and process readings from the plurality of actuators of each plate of the one or more plates corresponding to the positioning of the plurality of pins in the first axial direction and generate, based on the readings from the plurality of actuators of each plate of the one or more plates, output data corresponding to a digital model of an article with surfaces corresponding to the molding surface of the each plate of the one or more plates.

In some embodiments, the controller includes a processor for executing instructions stored in a memory component to receive and process readings obtained from the plurality of actuators of each plate of the reconfigurable mold and generate, based on the readings from the plurality of actuators of each plate of the reconfigurable mold, output data corresponding to a digital model of an article with surfaces corresponding to the molding surface of each plate of the one or more plates.

The molding subsystem can be utilized in combination with a resin injection assembly to provide an improved injection molding system which can be used for manufacturing various articles of different dimension and shape without the use of multiple static molds.

DESCRIPTION OF THE DRAWINGS

FIG. 8A is a partial side view of a first alternative plate construction;

FIG. 8B is another partial side view of the first alternative plate construction similar to FIG. 8A, but with pins of the first alternative plate construction in a raised position;

DESCRIPTION OF THE INVENTION

The present invention a molding subsystem which includes a reconfigurable mold, and which can be implemented within an injection molding system to facilitate the rapid manufacturing of different parts without the need for multiple premade molds or casts.

Figure 1:
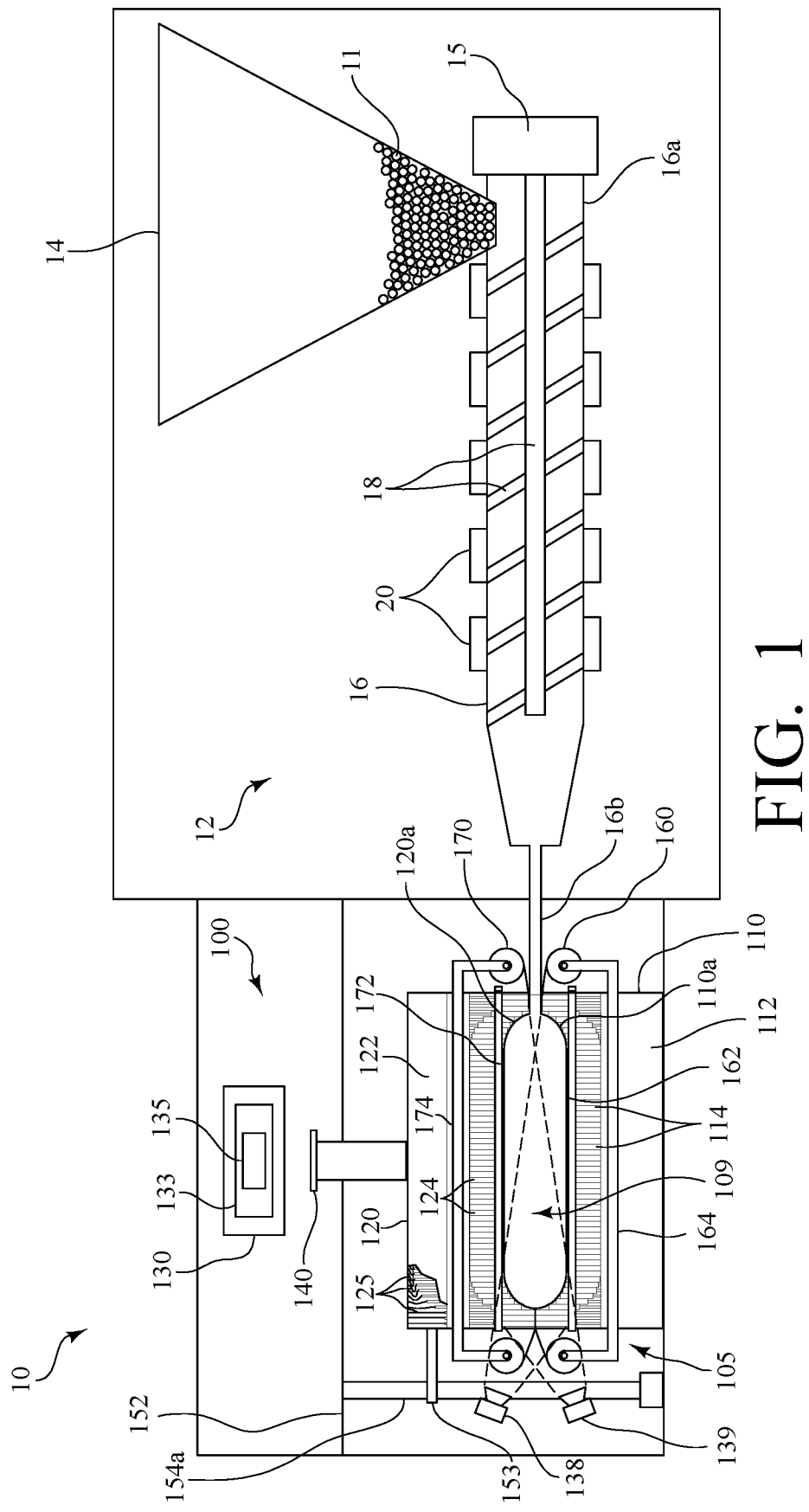
FIG. 1 is a schematic view of an injection molding system, including an exemplary molding subsystem made in accordance with the present invention.

FIG. 1 is a schematic view of an injection molding system 10, including an exemplary molding subsystem 100 made in accordance with the present invention.

FIGS. 2A-2D are perspective views of a reconfigurable mold 105 of the exemplary molding subsystem 100 of FIG. 1 in various configurations during the manufacture of an article 50.

As shown in FIGS. 1 and 2A-2D, the injection molding system 10 includes: a resin injection assembly 12 that is configured to process resin 11 deposited into the resin injection assembly 12 and subsequently emit the resin 11 in a heated, liquefied form; and the molding subsystem 100, which is in fluid communication with the resin injection assembly 12 so that liquefied resin 11 emitted from the resin injection assembly 12 is directed into the molding subsystem 100. The molding subsystem 100 can be selectively activated to provide a cavity 109 that corresponds to an article intended for manufacture and in which liquefied resin 11 emitted from the resin injection assembly 12 is received and shaped to form the article. To this end, the molding subsystem 100 includes a reconfigurable mold 105 with one or more molding surfaces 110a, 120a that define the cavity 109 into which the liquefied resin 11 is deposited.

Referring still to FIGS. 1 and 2A-2D, the reconfigurable mold 105 includes one or more plates 110, 120, with each plate 110, 120 including a plurality of pins 114, 124 that collectively define a molding surface 110a, 120a of the reconfigurable mold 105 and a frame 112, 122 that defines a plurality of channels 113 in which the plurality of pins 114, 124 are received. Each respective pin can be selectively moved in at least one axial direction to affect the overall shape of the molding surface 110a, 120a of the plate 110, 120 to which the pin corresponds. Thus, unlike traditional molds employed in injection molding systems and applications, which are static and include fixed molding surface(s) that define a cavity of fixed dimension—and thus can only be utilized in the construction of a single article—the one or more molding surfaces 110a, 120a of the reconfigurable mold 105 can be selectively manipulated as needed or desired to facilitate the construction of multiple, different articles, as further described below. That is, the one or more molding surfaces 110a, 120a of the reconfigurable mold 105 can be selectively adjusted to define cavities of various dimensions and shapes to correspond to differently dimensioned articles intended for manufacture. In this way, the reconfigurable mold 105 can thus serve to eliminate or reduce the need for multiple static molds and the cost and downtime associated therewith. To provide selective, automated movement of the pins within the reconfigurable mold 105, each plate 110, 120 of the reconfigurable mold 105 further includes a plurality of actuators 117, 127 (FIGS. 3A, 3B, 5, and 13) where each actuator 117, 127 corresponds to at least one pin of the plurality of pins 114, 124 of the plate 110, 120 and can be selectively activated to move the pin (or pins) to which the actuator 117 corresponds in a first axial direction (along a z-axis for vertical movement of the pin (or pins)). As further described below, the molding subsystem 100 further includes a control subsystem 130 (FIG. 13), which can be used to selectively activate the plurality of actuators 117, 127 of each plate 110, 120 of the reconfigurable mold 105 and/or obtain readings from the plurality of actuators 117, 127 of each plate 110, 120. As also further described below, the molding subsystem 100 can, in some embodiments, further include a locking mechanism for each plate of the one or more plates 110, 120 of the reconfigurable mold 105. In such embodiments, each locking mechanism can be selectively activated to laterally move the plurality of pins of the plate to which the locking mechanism corresponds in at least one of a second axial direction (along an x-axis for lateral movement in a first direction) and a third axial direction (along a y-axis for lateral movement in a second direction) that is perpendicular to the second axial direction to hold (or lock) the pins in a fixed, locked configuration.

Referring now specifically to FIG. 1, in this exemplary embodiment, the resin injection assembly 12 includes: a hopper 14; a reservoir 16; a screw 18 positioned within the reservoir 16; and one or more heaters 20. As shown, the hopper 14 is configured to receive resin 11 and is in fluid communication with the reservoir 16, such that resin 11 loaded into the hopper 14 can subsequently pass into the reservoir 16. The one or more heaters 20 are positioned on or around the reservoir 16, such that thermal energy emitted from the one or more heaters 20 heats the reservoir 16 and any resin 11 contained therein. In this particular implementation, the resin 11 is initially introduced into the hopper 14 as solid pellets. As the pellets transition from the hopper 14 into a proximal end 16a of the reservoir 16, the heat from the one or more heaters 20 converts the pellets into a liquefied form that is suitable for injection into the reconfigurable mold 105 of the molding subsystem 100. In this exemplary embodiment, the one or more heaters 20 comprises multiple heaters, which, in this case, there are ten that are positioned about the reservoir 16 as to form a jacket that helps to ensure the liquefied resin 11 is in a molten, or close to molten, state prior to injection into the reconfigurable mold 105 of the molding subsystem 100. Alternative implementations are, however, contemplated in which the resin 11 is first introduced into the resin injection assembly 12 (e.g., loaded into the hopper 14 or the reservoir 16) in liquefied form. In use, the material of the resin 11 utilized in the injection molding system 10 will vary depending on the application for which the injection molding system 10 is being utilized. For instance, a plastic-polymer-based resin may be utilized in applications in which the desired article intended to be manufactured by the injection molding system 10 requires a pliable construction, whereas a metal-based resin may be utilized in instances where the desired article intended to be manufactured by the injection molding system 10 requires a more durable or rigid construction.

Referring still to FIG. 1, to prevent or reduce the degree of environmental moisture retained by the resin 11, in some embodiments, the hopper 14 may be a component of a miniaturized dryer/hopper system, which is configured to dry resin 11 deposited in the hopper 14 by circulating air through the hopper 14 prior to the resin 11 passing into the reservoir 16. In this regard, the miniaturized dryer/hopper system may include one or more fans (not shown) or other means of circulating air through the hopper 14. Of course, implementations are also contemplated in which the resin 11 is pre-dried prior to its introduction into the injection molding system 10. For instance, implementations are contemplated in which the resin 11 comprises prepackaged, dried polymers, thereby eliminating the need to dry the resin 11 altogether.

Referring still to FIG. 1, the screw 18 of the resin injection assembly 12 is configured to rotate, via actuation of motor 15, and urge liquefied resin 11 within the reservoir 16 towards a distal end 16b (or nozzle) of the reservoir 16 for subsequent injection into the reconfigurable mold 105. To enable the liquefied resin 11 to flow from the distal end 16b of the reservoir 16 into the cavity 109 defined by the one or more molding surfaces 110a, 120a of the reconfigurable mold 105, select pins of the one or more plates 110, 120 are moved in the first axial direction to define a sprue 107 (FIG. 2B) leading from the distal end 16b of the reservoir 16 to the cavity 109. It should be appreciated that while only a single sprue 107 is illustrated within the drawings, embodiments are contemplated in which select pins of the one or more plates 110, 120 of the reconfigurable mold 105 define multiple sprues as to permit entry of liquefied resin into the cavity 109 at multiple locations. It should also be appreciated that, due to the dynamic nature of the pins of the one or more plates 110, 120 of the reconfigurable mold 105, the sprue (or sprues) may be formed at different locations about the one or more plates 110, 120 than the position illustrated within the drawings.

For quality control, the resin injection assembly 12 can further include a number of optional components for monitoring liquefied resin 11 and/or ensuring the liquefied resin 11 satisfies certain criteria prior to injection into the reconfigurable mold 105. For instance, in some embodiments, the resin injection assembly 12 may further include an agitation mechanism (not shown) configured to mix, shake, and/or vibrate the liquefied resin 11 within the reservoir 16 prior to rotation of the screw 18 to ensure that the liquefied resin 11 is of a consistent viscosity. Moreover, to ensure consistent texture and flow rate, the resin injection assembly 12 can further include, in some embodiments, a temperature-controlled sieve (not shown) through which the liquefied resin 11 passes prior to deposit into the reconfigurable mold 105. In one such embodiment, the distal end 16b of the reservoir 16 is shaped as to define such a sieve. In this exemplary embodiment, the resin injection assembly 12 also includes one or more sensors 13 (FIG. 13) for monitoring internal conditions within the resin injection assembly 12. Such sensors can include: flow rate sensors (e.g., optical flow sensors) positioned, and configured to obtain readings regarding the volumetric flow rate of liquefied resin 11, within the reservoir 16; temperature sensors positioned, and configured to obtain readings regarding the temperature of the resin 11, within the hopper 14 and/or reservoir 16; and/or one or more sensors configured to obtain readings regarding the rotation rate of the screw 18. In some embodiments, motor 15 of the screw 18, in addition to driving rotation of the screw 18, may be configured to obtain readings regarding rotation of the screw 18 and thus be characterized as a sensor 13 of the resin injection assembly 12. To provide feedback to an operator of the injection molding system 10 as to whether any adjustments (e.g., temperature level, screw 18 actuation rate (revolutions per minute), etc.) are needed, the one or more sensors 13 of the resin injection assembly 12 are, in this exemplary embodiment, operably connected to the control subsystem 130 (FIG. 13), such that readings gathered by the sensor(s) 13 of the resin injection assembly 12 are transmitted to the control subsystem 130 for subsequent processing. Based on the readings from the sensor(s) 13, a controller 132 (FIG. 13) of the control subsystem 130 can communicate instructions (signals) to adjust operation of the resin injection assembly 12 (e.g., increasing the temperature of the one or more heaters 20 or increasing the screw 18 actuation rate) and/or provide an output to the operator (e.g., via a display 135 (FIGS. 1, 11, 12, and 13)).

Figure 2A:
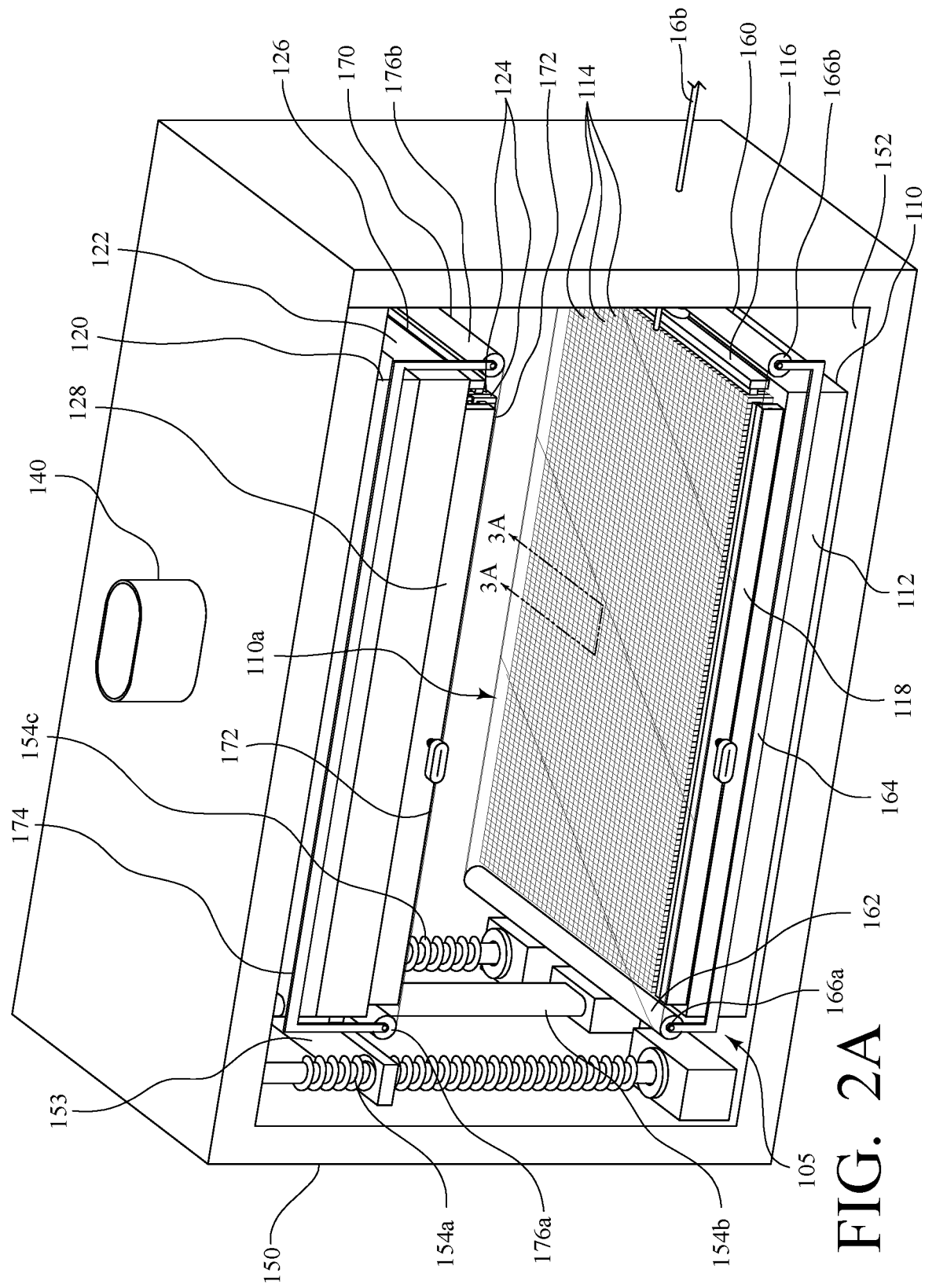
FIG. 2A is a perspective view of a reconfigurable mold of the exemplary molding subsystem of FIG. 1, but with the reconfigurable mold in an open, zeroed configuration as compared to FIG. 1.
Figure 3A:
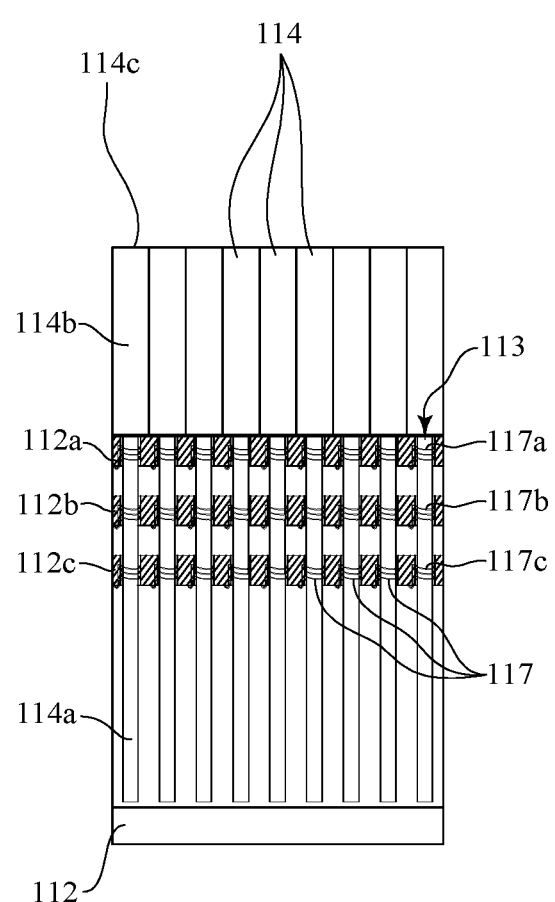
FIG. 3A is a sectional view of a first plate of the reconfigurable mold taken along line 3A-3A of FIG. 2A.

FIG. 3A shows a cross-section of the first plate 110 of the reconfigurable mold 105 taken along line 3A-3A in FIG. 2A.

Figure 2B:
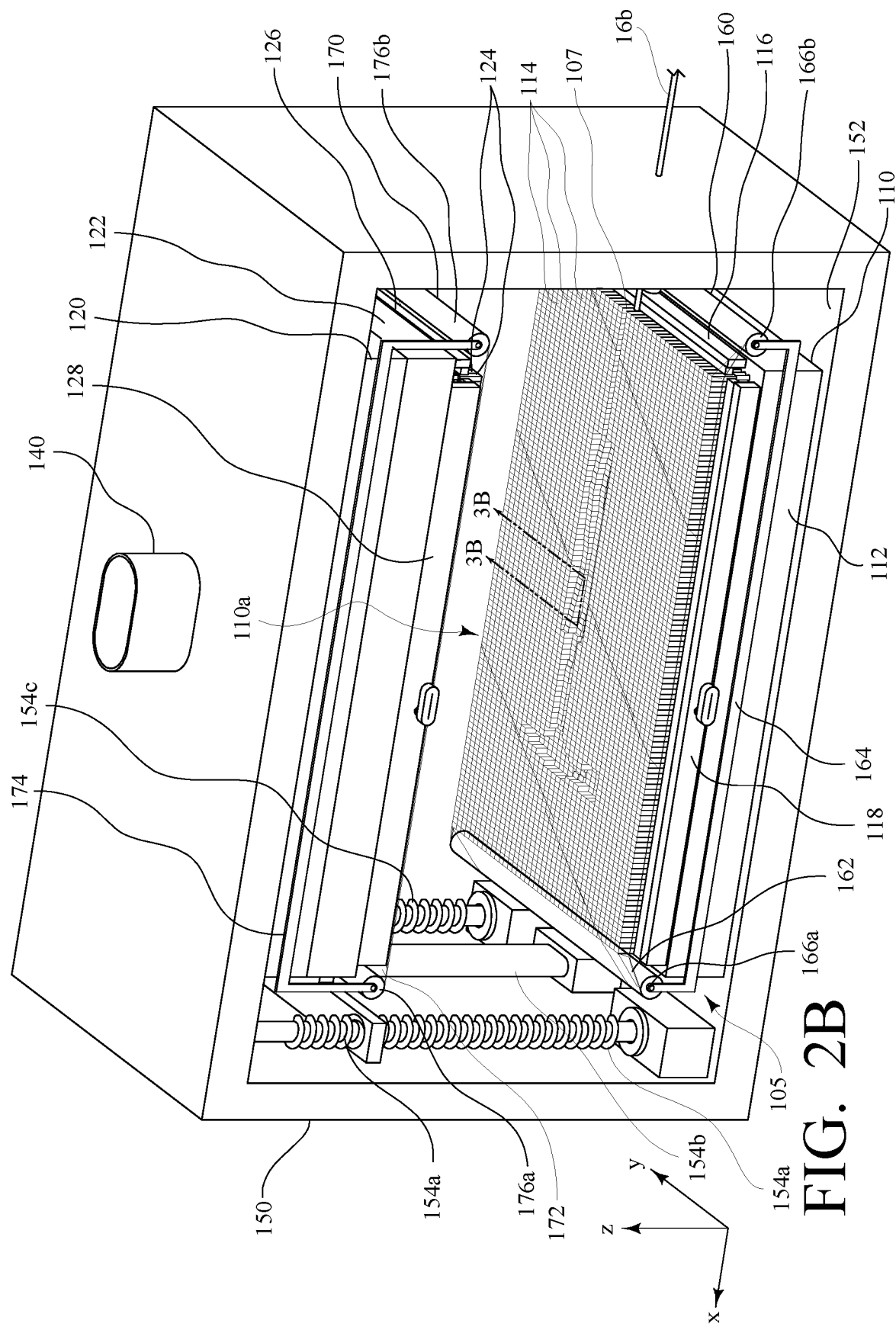
FIG. 2B is another perspective view of the reconfigurable mold similar to FIG. 2A, but with the reconfigurable mold in an open, non-zeroed configuration.
Figure 3B:
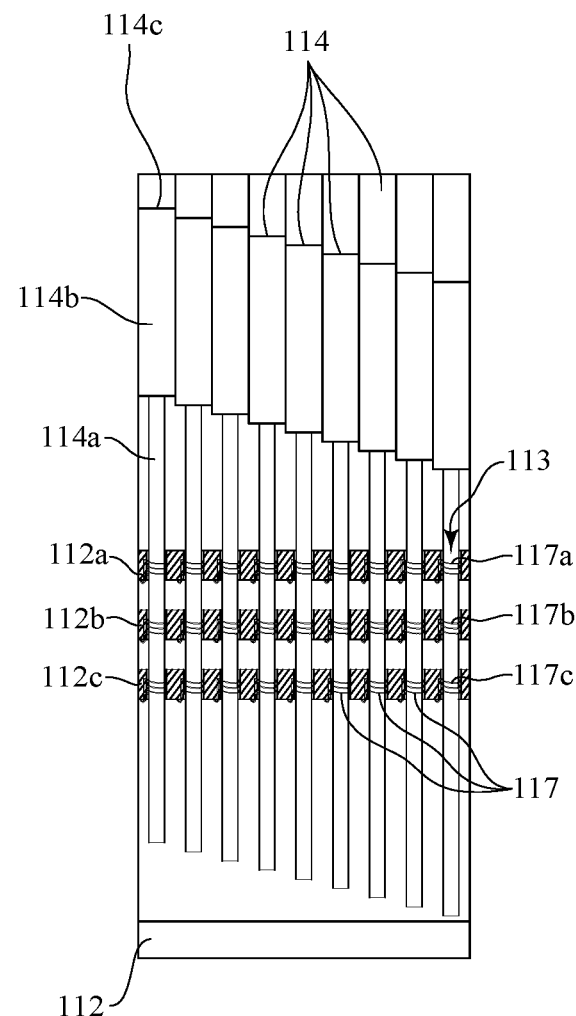
FIG. 3B is a sectional side view the first plate of the reconfigurable mold taken along line 3B-3B of FIG. 2B.

FIG. 3B shows a cross-section of the first plate 110 of the reconfigurable mold 105 taken along line 3B-3B in FIG. 2B.

Figure 5:
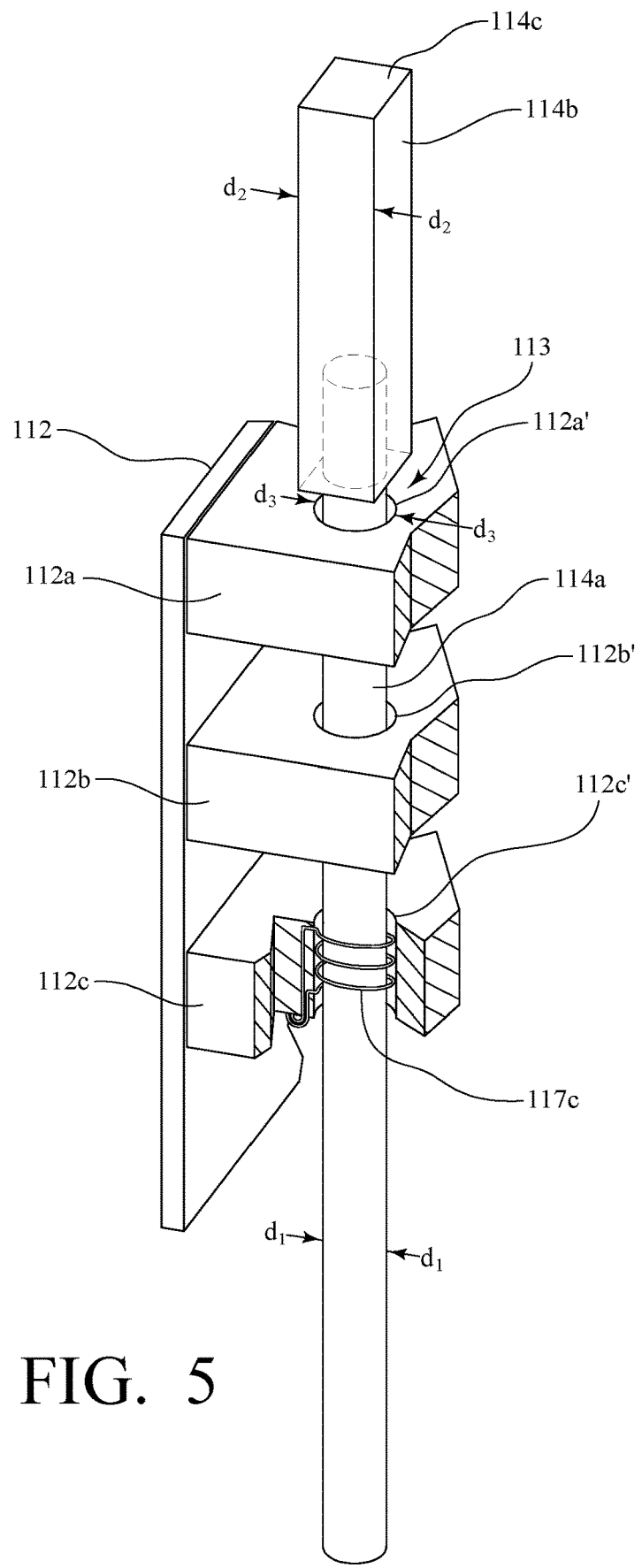
FIG. 5 is a partial view of the first plate of the reconfigurable mold of the exemplary molding subsystem of FIG. 2A.

FIG. 5 is a partial view of the first plate 110 of the reconfigurable mold 105 of the exemplary molding subsystem 100.

Referring now to FIGS. 1, 2A-2D, 3A-3B, and 5, in this exemplary embodiment, the reconfigurable mold 105 includes a first plate 110 and a second plate 120. The first plate 110 includes a first plurality of pins 114 that collectively define a first molding surface 110a of the reconfigurable mold 105. As shown, the first plurality of pins 114 are positioned in an array in the first plate 110 so that a first molding surface 110a of the reconfigurable mold 105 retains the shape of a rectangular grid. One of ordinary skill in the art will appreciate, however, that the first plurality of pins 114 may be alternatively positioned so that the first molding surface 110a retains a different shape without departing from the spirit or scope of the present invention. Likewise, one of skill in the art will also appreciate that the number of pins within the first plurality of pins 114 may be increased or decreased from that illustrated in FIGS. 2A-2D to better accommodate different molding applications or environments without departing from the spirit and scope of the present invention. For example, for molding applications requiring higher resolution molds, the first plurality of pins 114 may include more pins than that illustrated in FIGS. 2A-2D, while, in other molding applications requiring lower resolution molds, fewer pins may be used. The first plate 110 also includes a frame (or first frame) 112 which defines, and thus can be characterized as including, a plurality of channels 113 in which the first plurality of pins 114 are received and positioned. Specifically, in this exemplary embodiment, each respective pin of the first plurality of pins 114 is positioned in one of the plurality of channels 113 defined by the first frame 112, such that each pin can be selectively moved within the channel in the first axial direction, which, in this case, is a z-axial direction (as indicated by the x, y, and z axis in FIG. 2B), to affect the overall shape exhibited by the first molding surface 110a. As such, the first molding surface 110a of the first plate 110 can thus be adapted to correspond to one or more surfaces of a prototype, part, or other desired article 50, which, in this particular implementation, is a hammer (FIG. 2D), and define, in some cases and at least in part, a sprue 107, via movement of the first plurality of pins 114 in the first axial direction, as shown best by viewing FIGS. 2A and 2B in sequence and FIGS. 3A and 3B in sequence.

Referring now specifically to FIGS. 3A and 3B, in this exemplary embodiment, to facilitate repositioning of the first plurality of pins 114, each respective pin of the first plurality of pins 114 is operably connected to an actuator of the first plurality of actuators 117 of the first plate 110, such that the actuator can be selectively activated to move the pin to which it corresponds from the zeroed position a desired distance in the first axial direction. Each respective actuator of the first plurality of actuators 117 is operably connected to the control subsystem 130, such that each actuator of the first plurality of actuator 117 can be individually activated thereby, as further described below. To address individual pins of the first plurality of pins 114 in the first plate 110 and increase the number of surface arrangements the first molding surface 110a can assume, each actuator of the first plurality of actuators 117 preferably corresponds and is operably connected to a single pin of the first plurality of pins 114. Accordingly, in this exemplary embodiment, the number of actuators in the first plurality of actuators 117 is equal to the number of pins in the first plate 110. Alternative embodiments are, however, contemplated in which multiple pins of the first plurality of pins 114 are addressed by and operably connected to a single actuator of the first plurality of actuators 117, such that subsets of multiple pins can be addressed simultaneously by a single actuator of the first plurality of actuators 117.

Referring now to FIGS. 3A, 3B, and 5, in this exemplary embodiment, each actuator of the first plurality of actuators 117 is an electromagnetic actuator and a base 114a of each pin of the first plurality of pins 114 is constructed of a magnetic material, such as a ferrous oxide (iron) or comparable material. Of course other suitable materials may be utilized to construct the base 114a of each pin without departing from the spirit and scope of the present invention. For instance, in some embodiments, soft iron ore or variants thereof may be utilized. Additionally, in some embodiments, electrical steel, an iron alloy tailored to produce specific magnetic properties: small hysteresis area resulting in low power loss per cycle, low core loss, and high permeability, or neodymium or cobalt iron, such as VACOFLUX, may be utilized.

Referring still to FIGS. 3A, 3B, and 5, as shown, in this exemplary embodiment, each actuator of the first plurality of actuators 117 is a solenoid that includes one or more wound coils 117a, 117b, 117c, which, in this case, there are three: a first wound coil 117a; a second wound coil 117b; and a third wound coil 117c. The first wound coil 117a, the second wound coil 117b, and the third wound coil 117c are each configured to receive the base 114a of one of the pins of the first plurality of pins 114 and to receive an electrical current to move the pin in the first axial direction. In this regard, the first wound coil 117a, the second wound coil 117b, and the third wound coil 117c are configured such that, when an electrical current is directly applied to the first wound coil 117a, the second wound coil 117b, and/or the third wound coil 117c, a pushing force is generated and acts upon the base 114a of the pin received therein. As a result the pin is urged upwardly through the channel 113 in which it is positioned. In this regard, the base 114a of each respective pin may be characterized as acting as a piston. As further described below, in this exemplary embodiment, current can be selectively applied to a single one or each of the first wound coil 117a, the second wound coil 117b, and the third wound coil 117c of each actuator in response to instructions (signals) communicated by a controller 132 of the control subsystem 130 to affect the extent to which the pin corresponding to the actuator is moved in the first axial direction from a zeroed (or resting position). To facilitate the flow of current, the first wound coil 117a, the second wound coil 117b, and the third wound coil 117c of each solenoid is constructed of a suitable, electrically conductive material, such as copper.

Referring still to FIGS. 3A, 3B, and 5, in this exemplary embodiment, the first frame 112 includes: a first frame layer 112a (or platform) corresponding to the first wound coil 117a of each solenoid in the first plurality of actuators 117; a second frame layer 112b (or platform) corresponding to the second wound coil 117b of each solenoid in the first plurality of actuators 117; and a third frame layer 112c (or platform) corresponding to a third wound coil 117c of each solenoid in the first plurality of actuators 117. More specifically, in this exemplary embodiment, each respective platform 112a, 112b, 112c of the first frame 112 defines a plurality of aligned openings (or subchannels 112a', 112b', 112c'), which collectively define the plurality of channels 113 of the first frame 112. Accordingly, when the pins of the first plurality of pins 114 of the first plate 110 are in the zeroed position, each respective pin passes through a single channel collectively defined by a first subchannel 112a' of the first platform 112a, a second subchannel 112b' of the second platform 112b, and a third subchannel 112c' of the third platform 112c.

Referring still to FIGS. 3A, 3B, and 5, to stabilize the solenoids of the first plurality of actuators 117 within the first frame 112, the first wound coil 117a, the second wound coil 117b, and the third wound coil 117c of each solenoid of the first plurality of actuators 117 is deposited in an aligned set of subchannels defined by the first platform 112a, the second platform 112b, and the third platform 112c, respectively. Further to this end, the first wound coil 117a, the second wound coil 117b, and the third wound coil 117c of each actuator of the first plurality of actuators 117 is attached to an exterior surface of the first platform 112a, the second platform 112b, and the third platform 112c, respectively, as shown best by the attachment of the terminal ends of the third wound coil 117c to the bottom surface of the third platform 112c in FIG. 5. In other words, the multiple wound coils of each solenoid of the first plurality of actuators 117 is attached to a different platform of the first frame 112. To facilitate communication between each actuator of the first plurality of actuators 117 and the control subsystem 130 as described herein and to reduce excessive wiring between the platforms 112a, 112b, 112c of the first frame 112, in this exemplary embodiment, the first platform 112a, the second platform 112b, and the third platform 112c each comprise a printed circuit board. As such, each platform of the first frame 112 includes a plurality of electrically conductive pathways to which wound coils of the first plurality of actuators 117 and the controller 132 of the control subsystem 130 are electrically connected.

Referring now to FIGS. 1, 2A-2D, 3A, 3B, and 5, each respective pin of the first plurality of pins 114 defines, and thus can be characterized as including: a base 114a, which, as noted above, is received within and can be acted upon by the wound coils 117a, 117b, 117c of the first plurality of actuators 117; and a shaft (or head) 114b, which is secured to, or integrally formed with, the base 114a. In this exemplary embodiment, the base 114a of each pin is cylindrically shaped and defines the lowermost portion of the pin which is received in the interior of the first frame 112. As shown best in FIG. 5, to facilitate movement of each pin within the channel of the first frame 112 in which it is received not only in the first axial direction, but also a second axial direction (along an x-axis) and a third axial direction (along a y-axis), the diameter, $d_1$, of the base 114a is smaller than the diameter, $d_3$, of each respective subchannel defining such channel. In this exemplary embodiment, the head 114b of each respective pin of the first plurality of pins 114 is of a rectangular cuboidal shape and includes a terminal end that defines a top 114c of the pin which corresponds to a portion of the first molding surface 110a. As shown in FIG. 5, the diameter, $d_2$, of the head 114b of each respective pin is larger than the diameter, $d_3$, of the subchannels of the channel of the first frame 112 in which the pin is received. This allows the pin to rest on an upper surface of the first platform 112a of the first frame 112 when the actuator to which the pin corresponds is not activated (i.e., when neither the first wound coil 117a, the second wound coil 117b, nor the third wound coil 117c are supplied with electrical current) and the first plurality of pins 114 are in the zeroed position. In some embodiments, the base 114a of each respective pin of the first plurality of pins 114 may be coated with a non-conductive ceramic or polymer material and the head 114b of each respective pin of the first plurality of pins 114 constructed of a non-conductive material.

It is appreciated, however, that the geometric dimensions of the base 114a and/or head 114b of each respective pin can be modified to retain different shapes without departing from the spirit or scope of the present invention. For example, in alternative embodiments, the head 114b of each respective pin may retain a rectangular, cylindrical, or hexagonal prism shape. Likewise, while the top 114c of each respective pin of the first plurality of pins 114 is illustrated as being a flat surface, alternative embodiments are contemplated in which the top 114c of each pin is alternatively shaped to better accommodate different molding applications or to optimize the resolution of the desired article 50 for which the reconfigurable mold 105 is intended to produce and/or to reduce pin adhesion to the material injected into the reconfigurable mold 105 or membrane overlying the first plurality of pins 114. For example, in some embodiments, the first plurality of pins 114 may be spherical with rounded edges. Further to this end, in some embodiments, the base 114a, head 114b, and/or top 114c of each respective pin of the first plurality of pins 114 may also be provided with an additional coating, such as a ceramic, polymer, or metal coating. One of skill in the art will also appreciate that the length of the respective pins of the first plurality of pins 114 can be adjusted to affect pin movement range in the first axial direction in response to activation of the actuator of the first plurality of actuators 117 to which it corresponds to accommodate different molding applications without departing from the spirit or scope of the present invention.

Although, in the embodiments in which the first plurality of actuators 117 are solenoids, each respective actuator is primarily illustrated and described as including three wound coils, the first plurality of actuators 117 are not limited to such construction. Rather, it should be appreciated that, in some embodiments and applications, the use of more than three wound coils may be desirable, while, in other embodiments and applications, the use of less than three wound coils may be suitable.

Figure 4A:
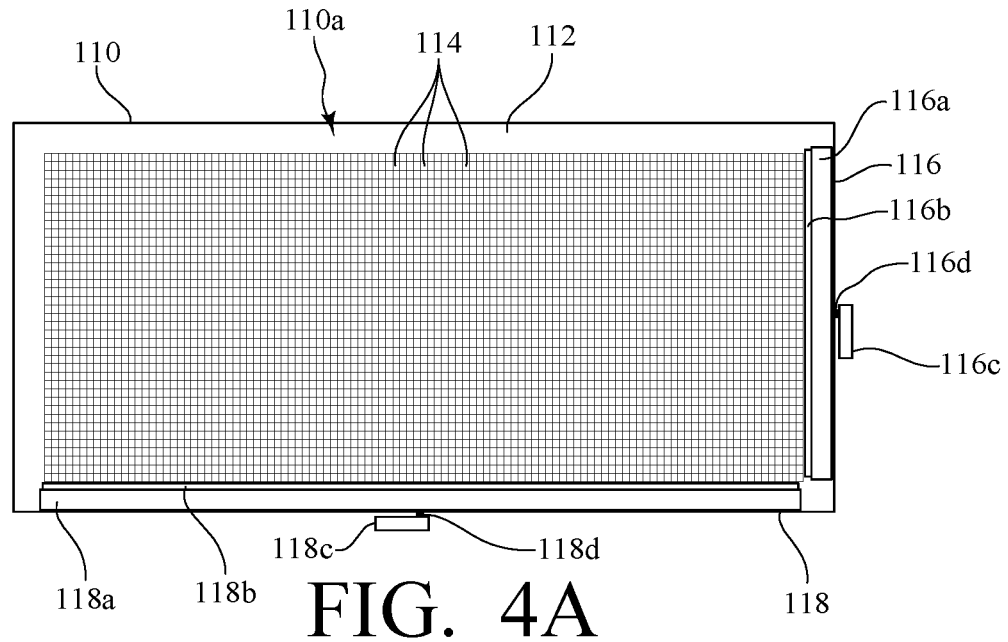
FIG. 4A is a top view of the first plate of the reconfigurable mold and a locking mechanism of the exemplary molding subsystem of FIG. 1.
Figure 4B:
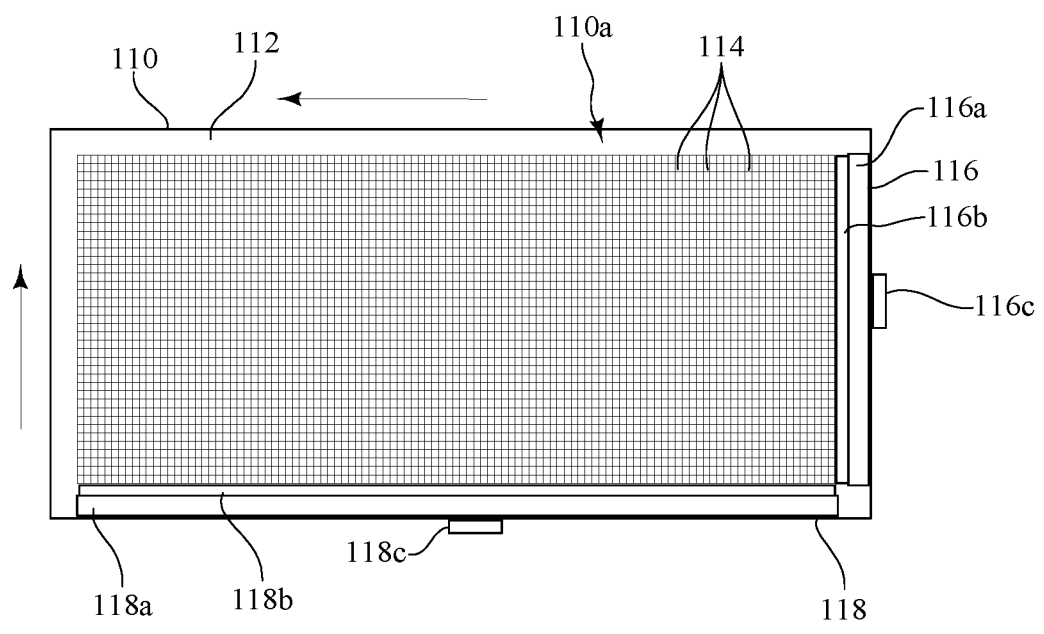
FIG. 4B is another top view of the first plate of the reconfigurable mold and the locking mechanism similar to FIG. 4A, but with the pins of the first plate and the locking mechanism in a locked configuration.

FIGS. 4A-4B are various top views of the first plate 110 of the reconfigurable mold 105 and a locking mechanism 116, 118 of the exemplary molding subsystem 100 of FIG. 1.

Referring now to FIGS. 1, 2A-2D, 4A, and 4B, in this exemplary embodiment, to hold (or lock) the first plurality of pins 114 of the first plate 110 in position once moved in the first axial direction to shape the first molding surface 110a in a desired manner, the molding subsystem 100 further includes a locking mechanism 116, 118 for the first plate 110 that can be selectively activated to transition the locking mechanism 116, 118 between a first (or unlocked) configuration (FIG. 4A) and a second (or locked) configuration (FIG. 4B). In this exemplary embodiment, the locking mechanism 116, 118 for the first plate 110 includes: a first locking mechanism 116 configured to move the first plurality of pins 114 in the second axial direction (along an x-axis) and; a second locking mechanism 118 configured to move the first plurality of pins 114 in the third axial direction (along a y-axis).

Referring now specifically to FIGS. 4A and 4B, the first locking mechanism 116 includes: a base 116a that is mounted to the first frame 112; a brace bar 116b configured to engage a first row of pins of the first plurality of pins 114 adjacently positioned to the first locking mechanism 116; and a handle 116c. The handle 116c is connected to the brace bar 116b and is mounted for rotation with respect to the base 116a, such that, as the handle 116c is rotated in a first rotational direction (e.g., clockwise) the brace bar 116b moves away from the base 116a to engage and push the first row of pins in the second axial direction (as indicated by the horizontal arrow in FIG. 4B), thereby placing the first locking mechanism 116 in the locked configuration. Conversely, when the handle 116c is rotated in a second rotational direction (e.g., counterclockwise), the brace bar 116b moves toward the base 116a and is removed from engagement with the first row of pins to place the first locking mechanism 116 in the unlocked configuration.

Referring now to FIGS. 1, 2A-2D, 3A, 3B, 4A, and 4B, in this exemplary embodiment, the handle 116c is mounted to a proximal end of a shaft, which, in this case, is a threaded screw 116d, which is provided in, and interlocked with, a threaded bore (not shown) defined by the base 116a and includes a distal end connected to the brace bar 116b. As the handle 116c is rotated in the first rotational direction or the second rotational direction, the threaded screw 116d is either driven through the threaded bore and toward the first plurality of pins 114 or through the threaded bore and away from the first plurality of pins 114, thereby pushing the brace bar 116b into contact with the first row of pins adjacently positioned to the first locking mechanism 116 or pulling the brace bar 116b out of contact with the same, respectively. As shown, in this exemplary embodiment, the diameter, $d_2$, of the head 114b of each respective pin of the first plurality of pins 114 and the distance between adjacent channels in the first plurality of channels 113 defined by the first frame 112 is such that, the head 114b of each respective pin of the first plurality of pins 114 is in contact with at least one other pin of the first plurality of pins 114 in the second axial direction. As a result, any pushing force applied by the brace bar 116b to the first row of pins adjacently positioned to the first locking mechanism 116 is translated throughout the first plurality of pins 114, such that each respective pin of the first plurality of pins 114 is moved in the second axial direction (as indicated by the horizontal arrow in FIG. 4B).

Referring still to FIGS. 1, 2A-2D, 3A, 3B, 4A, and 4B, the second locking mechanism 118 is of identical construction and functions in the same manner as the first locking mechanism 116, except that the second locking mechanism 118 can be activated to move the first plurality of pins 114 in the third axial direction. In this regard, like the first locking mechanism 116, the second locking mechanism 118 for the first plate 110 also includes a base 118a that is mounted to the first frame 112; a brace bar 118b configured to engage a second row of pins of the first plurality of pins 114 adjacently positioned to the second locking mechanism 118; and a handle 118c. The handle 118c is connected to the brace bar 118b and is mounted for rotation with respect to the base 118a, such that, as the handle 118c is rotated in a first rotational direction (e.g., clockwise) the brace bar 118b moves away from the base 118a to engage and push the second row of pins in the third axial direction (as indicated by the vertical arrow in FIG. 4B), thereby placing the second locking mechanism 118 in the locked configuration. Conversely, when the handle 118c is rotated in a second rotational direction (e.g., counterclockwise), the brace bar 118b moves toward the base 118a and is removed from engagement with the second row of pins to place the second locking mechanism 118 in the unlocked configuration.

Referring still to FIGS. 1, 2A-2D, 3A, 3B, 4A, and 4B, in this exemplary embodiment, the handle 118c of the second locking mechanism 118 is mounted to a proximal end of a shaft, which, in this case, is a threaded screw 118d, which is provided in, and interlocked with, a threaded bore (not shown) defined by the base 118a and includes a distal end connected to the brace bar 118b. As the handle 118c is rotated in the first rotational direction or the second rotational direction, the screw 118d is either driven through the threaded bore and toward the first plurality of pins 114 or through the threaded bore and away from the first plurality of pins 114, thereby pushing the brace bar 118b into contact with the second row of pins adjacently positioned to the second locking mechanism 118 or pulling the brace bar 118b out of contact with the same, respectively. As shown, in this exemplary embodiment, the diameter, $d_2$, of the head 114b of each respective pin of the first plurality of pins 114 and the distance between adjacent channels in the first plurality of channels 113 defined by the first frame 112 is such that, the head 114b of each respective pin of the first plurality of pins 114 is in contact with at least one other pin of the first plurality of pins 114 in the third axial direction. As a result, any pushing force applied by the brace bar 118b to the second row of pins adjacently positioned to the second locking mechanism 118 is translated throughout the first plurality of pins 114, such that each respective pin of the first plurality of pins 114 is moved in the third axial direction.

Referring now again specifically to FIGS. 4A and 4B, in this exemplary embodiment, the first locking mechanism 116 and the second locking mechanism 118 for the first plate 110 are configured to be activated via manual rotation of the handle 116c, 118c corresponding thereto. Alternative embodiments in which activation of the first locking mechanism 116 and the second locking mechanism 118 for the first plate 110 is automated are, however, contemplated herein. In such embodiments, the threaded screw 116d of the first locking mechanism 116 and the threaded screw 118d of the second locking mechanism 118 are each operably connected to a first motor (not shown) and a second motor (not shown), respectively. The first motor and the second motor are each configured to drive rotation of the threaded screw 116d, 118d to which it is operably connected, and the first motor and the second motor are operably connected to the control subsystem 100, such that the first motor and the second motor can be selectively activated to drive rotation of the threaded screw 116d, 118d to which it corresponds in response to instructions (signals) communicated from the controller 132 of the control subsystem 130.

Referring still to FIGS. 4A and 4B, while it is generally preferred that the first locking mechanism 116 and the second locking mechanism 118 both be activated to transition the first plurality of pins 114 to a locked configuration subsequent to first molding surface 110a being shaped in a desired manner to ensure the first plurality of pins 114 are still maintained in a fixed position in the event one of the locking mechanisms for the first plate 110 fails, it is not required. Rather, in some implementations, only one of the first locking mechanism 116 and the second locking mechanism 118 may be activated to transition the locked configuration. Furthermore, while the use of a dedicated locking mechanism for the first plate 110 is generally preferred to reduce the energy demands required by the molding subsystem 100, it is not required. In some implementations, as the first plurality of pins 114 are moved in the first axial direction by virtue the first plurality of actuators 117 being provided with specific voltages of electrical current (i.e., activated), the application of such voltages can be maintained during operation of the injection molding system 10 to hold the first plurality of pins 114 in the desired position while liquefied resin is injected into the reconfigurable mold 105. Embodiments in which direct current (DC) voltage is utilized to activate the first plurality of actuators 117 as well as embodiments in which the first plurality of actuators 117 are activated via the application of alternating current (AC) sinusoidal voltages using full wave bridge rectifiers are contemplated herein.

As further described below with reference to FIGS. 6A, 6B, 7A, 7B, 8A, 8B, 9, and 10, alternative pin actuating and locking means besides those described above are also contemplated herein. As such, one of skill in the art will appreciate that the shape, texture, and/or material or materials used in the construction of the base 114a and head 114b of each respective pin of the first plurality of pins 114 may be selected based on the pin actuation means utilized, pin locking means employed, and/or intended molding application. It is thus appreciated that the shape, texture, and/or material or materials of the pins of the first plurality of pins 114 may vary depending on the different pin actuation and/or locking means employed.

Referring now again to FIGS. 1 and 2A-2D, in this exemplary embodiment, the second plate 120 is positioned above, and in an inverted configuration relative to, the first plate 110 of the reconfigurable mold 105. As such, the first plate 110 may be characterized as defining a "bottom" plate of the reconfigurable mold 105, and the second plate 120 may be characterized as defining a "top" plate of the reconfigurable mold 105. The second plate 120 of the reconfigurable mold 105 is of identical construction to and functions in the same manner as the first plate 110, except as otherwise noted herein. In this regard, the second plate 120 includes a second frame 122, a second plurality of pins 124 that collectively define a second molding surface 120a, and a second plurality of actuators 127 (FIG. 13) that are operably connected to the control subsystem 130. The second frame 122, the second plurality of pins 124, and the second plurality of actuators 127 are of the same construction and function in the same manner as the first frame 112, the first plurality of pins 114, and the first plurality of actuators 117, respectively, of the first plate 110. Unlike the first plurality of actuators 117 of the first plate 110, which, when activated, apply a pushing force that moves the heads 114b of the first plurality of pins 114 away from the first frame 112 in the first axial direction, the second plurality of actuators 127 of the second plate 120, due to the inverted configuration of the second plate 120, are configured to apply a pulling force that moves the heads of the second plurality of pins 124 toward the second frame 122. Furthermore, unlike the first plurality of pins 114 of the first plate 110, the terminal end defined by the base of each respective pin of the second plurality of pins 124 is connected (or tethered) to the second frame 122 via a retention member 125 to prevent the pin from falling through the second frame 122 due to the force of gravity. To this end, in this exemplary embodiment, each retention member 125 comprises a flexible string that extends between, and is connected to, the second frame 122 and the pin of the second plurality of pins 124 to which it corresponds. Each retention member 125 can be easily cut to release the pin from the second plate 120 in instances where the pin becomes damaged or otherwise needs replaced. It should be appreciated that while the individual platforms of the second frame 122 and the second plurality of actuators 127 (and individual wound coils thereof) have been omitted in FIG. 1 to better illustrate the retention members 125 and are not visible in FIGS. 2A-2D, such components are nevertheless present in the second plate 120 in similar fashion as the individual platforms of the first frame 112 and the first plurality of actuators 117 of the first plate 110.

Other flexible or compressible articles, such as a wires or springs, may alternatively be used for the retention members 125 without departing from the spirit or scope of the present invention. For instance, in some embodiments, each respective pin of the second plurality of pins 124 may be connected to the second frame 122 via a compression spring. The use of specific spring types in association with the first plurality of pins 114 and/or the second plurality of pins 124 can also be used, in alternative embodiments, to reverse the nature of the electromotive force which must be applied to move the pins in the first axial direction. For instance, in one alternative embodiment, the first plurality of pins 114 may be connected to the first frame 112 via compression springs, such that the first plurality of actuators 117, when activated, need to apply a pulling force in order to move the first plurality of pins 114 downwardly toward the first frame 112 in the first axial direction from a maximum (raised) position. In such alternative embodiment, the second plurality of pins 124 may be connected to the second frame 122 via a tension spring, such that the second plurality of actuators 127, when activated, need to apply a pushing force in order to move the second plurality of pins 124 downwardly away from the second frame 122 in the first axial direction from a minimum (lowered) position.

Alternative embodiments in which the second plurality of pins 124 are maintained in association with the second frame 120 while in the zeroed position without the aid of the above-described retention members are also contemplated herein. For instance, in one such embodiment, the terminal end of the base of each respective pin of the second plurality of pins 124 defines a platen and the base of each respective pin extends through a subchannel defined a base of the second frame 122, such that, when the second plurality of pins 124 is in the zeroed position, the platen is positioned outside of, and rests on top of, an exterior surface of the second frame 122.

Referring still to FIGS. 1 and 2A-2D, in this exemplary embodiment, to hold (or lock) the second plurality of pins 124 of the second plate 120 in position once moved in the first axial direction to shape the second molding surface 120a in a desired manner, the molding subsystem 100 further includes a locking mechanism 126, 128 for the second plate 120 that can be selectively activated to transition the locking mechanism 126, 128 between a first (or unlocked) configuration and a second (or locked) configuration. Like the locking mechanism 116, 118 for the first plate 110, in this exemplary embodiment, the second locking mechanism 126, 128 also includes two locking mechanisms: a third locking mechanism 126 configured to move the second plurality of pins 124 in the second axial direction; and a fourth locking mechanism 128 configured to move the second plurality of pins 124 in the third axial direction. The third locking mechanism 126 for the second plate 120 is of identical construction and functions in the same manner as the first locking mechanism 116 for the first plate 110, and the fourth locking mechanism 128 for the second plate 120 is of identical construction and functions in the same manner as the second locking mechanism 118 for the first plate 110.

Referring still to FIGS. 1 and 2A-2D, in use, once the first plurality of pins 114 and the second plurality of pins 124 are locked in place by activation of the locking mechanism 116, 118 for the first plate 110 and the locking mechanism 126, 128 for the second plate 120 (FIG. 2B), the reconfigurable mold 105 can be transitioned from an open configuration (FIGS. 2A and 2B) to a closed configuration (FIGS. 1 and 2C) to place the first molding surface 110a and the second molding surface 120a, or at least a portion thereof, in contact with each other and form the cavity 109. To transition the reconfigurable mold 105 between the open configuration and the closed configuration, the molding subsystem 100 further includes a plate actuator 140, which can be selectively activated to move the first plate 110 and the second plate 120 toward and away from each other. In this exemplary embodiment, the plate actuator 140 comprises a single linear actuator (e.g., a hydraulic press) to which the second frame 122 of the second plate 120 is mounted. The plate actuator 140 is configured to move the second plate 120 toward and away from the first plate 110, which, in this case, is mounted in a fixed position and does not move during operation of the molding subsystem 100. In this exemplary embodiment, the plate actuator 140 is operably connected to the control subsystem 130 (FIG. 13), such that the plate actuator 140 can be selectively activated to transition the reconfigurable mold 105 between the open configuration and the closed configuration in response to instructions (signals) communicated by the controller 132 of the control subsystem 130 (FIG. 130).

Referring still to FIGS. 1 and 2A-2D, the molding subsystem 100 further includes a framework 150 that is configured to support the first plate 110 and the second plate 120 opposite of each other and to guide movement of the second plate 120 toward and away from the first plate 110 as the plate actuator 140 is activated to transition the reconfigurable mold 105 between the closed configuration and open configuration. The framework 150 includes: an interior housing 152 in which the first plate 110, the second plate 120 and the locking mechanisms 116, 118, 126, 128 corresponding to are housed, and to which the first frame 112 is mounted in a fixed position; and one or more guide rails 154a, 154b, 154c to which the second plate 120 is mounted for travel, as evidenced by viewing FIGS. 2B-2D in sequence. In this exemplary embodiment, the second frame 122 of the second plate 120 is mounted to each guide rail 154a, 154b, 154c via bracket 153.

Although the reconfigurable mold 105 is illustrated within the drawings and primarily referred to herein as being transitioned between the closed configuration and the open configuration by virtue of the second plate 120 being moved toward or away from the first plate 110, alternative embodiments are contemplated in which the first plate 110 is mounted to the plate actuator 140 and to the one or more guide rails 154a, 154b, 154c and the reconfigurable mold 105 is closed and opened by virtue of the first plate 110 being moved toward and away from the second plate 120. Additionally, alternative embodiments, in which both the first plate 110 and the second plate 120 are moved to transition the reconfigurable mold 105 between the closed configuration and the open configuration are also contemplated herein. In such embodiments, the first plate 110 and the second plate 120 are both mounted for travel along the one or more guide rails 154a, 154b, 154c and the plate actuator 140 comprises two linear actuators: a first linear actuator, which is mounted to, and can be selectively activated to move, the first plate 110 upwardly in the first axial direction; and a second linear actuator, which is mounted to, and can be selectively activated to move the second plate 120 downwardly in the first axial direction.

In some embodiments, the controller 132 may be configured to calculate the tonnage required for an intended molding application (i.e., the amount of force which must be applied by the plate actuator 140 to keep the reconfigurable mold 105 in a closed configuration during resin injection using the flow rate of the resin 11 being extruded from the reservoir 16, the number of parts intended to be produced, pressure which the resin 11 is anticipated to exert on the reconfigurable mold 105, and volume of the cavity 109 formed by the reconfigurable mold 105. In some alternative embodiments, the first plurality of pins 114 and the second plurality of pins 124 may be operably connected to the controller 132 of the control subsystem 130, such that electrical current can be selectively applied directly to the first plurality of pins 114 and the second plurality of pins 124 (e.g., after being placed in a locked configuration). The direct application of electrical current to the first plurality of pins 114, the second plurality of pins 124 or subsets thereof, can induce controlled resistance with a by-product of heat to the pins to which the current is applied to ensure that the resin 11 injected into the reconfigurable mold 105 stays consistently molten during the resin injection process. Thus, by understanding the material composition, then applying a known current to each pin, a user can control the specific temperature of each pin, and therefore the collection of pins as a whole. Embodiments are also contemplated in which the first plate 110 and/or the second plate 120 may be provided with a heating element (not shown), e.g., deposited within the first frame 112 and/or the second frame 122, that is operably connected to the controller 132 of the control subsystem 130, such that the controller 132 can communicate instructions (signals) to selectively activate the heating element to warm the first plurality of pins 114 and the second plurality of pins 124 to ensure the resin 11 injected into the reconfigurable mold 105 stays consistently molten during the resin injection process.

Referring still to FIGS. 1 and 2A-2D, to mitigate any stair-stepping effect present in the cavity 109 resulting from adjacently positioned pins within each respective plate 110, 120 of the reconfigurable mold 105 being differently positioned in the first axial direction, in this exemplary embodiment, the reconfigurable mold 105 further includes a membrane dispensing assembly 160, 170 for each plate 110, 120 of the reconfigurable mold 105. Accordingly, in this exemplary embodiment, the molding subsystem 100 includes two membrane dispensing assemblies 160, 170: a first membrane dispensing assembly 160 for dispensing a first flexible barrier (or first membrane) 162 configured to cover the top 114c of each respective pin of the first plurality of pins 114 defining the first molding surface 110a; and a second membrane dispensing assembly 170 for dispensing a second flexible barrier (or second membrane) 172 configured to cover the top of each respective pin of the second plurality of pins 124 defining the second molding surface 120a. Thus, in use, the first membrane 162 and the second membrane 172 provide an intermediate barrier between the liquefied resin 11 injected into the cavity 109 and the first plurality of pins 114 and the second plurality of pins 124, respectively. Accordingly, in addition to smoothing out the contours of the portion of the cavity 109 defined by the first molding surface 110a and the second molding surface 120a, the first membrane 162 and the second membrane 172 also prevent the liquefied resin injected into the reconfigurable mold 105 from becoming deposited between the respective pins of the first plurality of pins 114 and the pins of the second plurality of pins 124, thereby eliminating or reducing the need to which the reconfigurable mold 105 must be cleaned between molding runs. Suitable materials from which the first membrane 162 and the second membrane 172 may be constructed, include, but are not limited to, parafilm and thin rubber.

Referring still to FIGS. 1 and 2A-2D, the first membrane dispensing assembly 160 includes: a first pair of spools 166a, 166b about which the first membrane 162 is wound;

and a first bracket 164 which is mounted to the first frame 112 of the first plate 110 and supports the first pair of spools 166a, 166b on opposite ends of the first plate 110. As perhaps shown best in FIGS. 2A and 2B, the first bracket 164 supports the first pair of spools 166a, 166b at a height, such that, when the first plurality of pins 114 are in the zeroed position, the top 114c of each respective pin of the first plurality of pins 114 is positioned slightly below or slightly touching the first membrane 162. Accordingly, and as shown in FIG. 2B, as pins of the first plurality of pins 114 are moved upwardly in the first axial direction to shape the first molding surface 110a in the desired manner and define the sprue 107, those pins engage (or further engage) the first membrane 162. The distance between the first pair of spools 166a, 166b is preferably such that the first membrane 162 is not sufficiently taut as to prevent the first membrane 162 from falling within the contours of the first molding surface 110a, as shown in FIG. 2B. In this exemplary embodiment, the first pair of spools 166a, 166b are motorized to automatically dispense a new portion of the first membrane 162 over the first plurality of pins 114 in between molding runs. That is, the first pair of spools 166a, 166b can be selectively driven to automatically wind a soiled portion of the first membrane 162 around one of the two spools and direct a new, clean portion of the first membrane 162 from the other of the two spools over the first plurality of pins 114. To this end, in this exemplary embodiment, the second spool 166b of the first pair of spools 166 is operably connected to a motor 165 that is configured to drive rotation of the second spool 166b in response to communications (signals) from the controller 132 of the control subsystem 130 (FIG. 13).

Referring now again to FIGS. 1 and 2A-2D, the second membrane dispensing assembly 170 is of identical construction to, and functions in the same manner as, the first membrane dispensing assembly 160, except with respect to the second plate 120 and except as otherwise noted herein. In this regard, the second membrane dispensing assembly 170 includes: a second pair of spools 176a, 176b about which the second membrane 172 is wound; and a second bracket 174 which is mounted to the second frame 122 of the second plate 120 and supports the second pair of spools 176a, 176b on opposite ends of the second plate 120. As shown in FIG. 2A, the second bracket 174 supports the second pair of spools 176a, 176b at a height, such that, when the second plurality of pins 124 are in the zeroed position, the top of each respective pin of the second plurality of pins 124 is positioned slightly above or slightly touching the second membrane 174. As pins of the second plurality of pins 124 are moved upwardly toward the second frame 122 in the first axial direction to shape the second molding surface 120a (which, although not visible in FIG. 2B, is a mirror image of the first molding surface 110a in FIG. 2B) in the desired manner and, in some cases, aid in defining the sprue 107, those pins are moved further away from the second membrane 172. The distance between the second pair of spools 176a, 176b is preferably such that the second membrane 172 is not sufficiently taught as to prevent the second membrane 172 from being pushed into the contours of the second molding surface 120a as liquefied resin 11 is injected into the cavity 109 of the reconfigurable mold 105. Like the first pair of spools 166a, 166b, the second pair of spools 176a, 176b are also motorized, such that the second pair of spools 176a, 176b can be selectively driven to automatically wind a soiled portion of the second membrane 172 around one of the two spools and direct a new, clean portion of the second membrane 172 from the other of the two spools over the second plurality of pins 124. In this exemplary embodiment, the second spool 176b of the second pair of spools is operably connected to a motor 175 that is configured to drive rotation of the second spool 176b in response to communications (signals) from the controller 132 of the control subsystem 130 (FIG. 13).

Although the use of the first membrane dispensing assembly 160 and the second membrane dispensing assembly 170 is generally preferred, alternative embodiments and implementations are contemplated herein in which liquefied resin 11 injected into the reconfigurable mold 105 directly contacts the heads 114b of the first plurality of pins 114 and the second plurality of pins 124 defining the cavity 109. In such embodiments and implementations, the heads 114b of such pins may be coated with a wax spray or an external releasing agent (e.g., steam, a wet lubricant, a dry lubricant, carbon nanoparticles, etc.), either manually or via a spraying device (not shown), to reduce adhesion of the resin 11 to the first plurality of pins 114 and the second plurality of pins 124. Alternative embodiments and implementations are also contemplated in which the first plurality of pins 114 and the second plurality of pins 124 are heated, vibrated, and/or suctioned to facilitate the removal of excess resin 11 remaining on the first plurality of pins 114 and the second plurality of pins 124 following the removal of a molded article from the reconfigurable mold 105.

Figure 13:
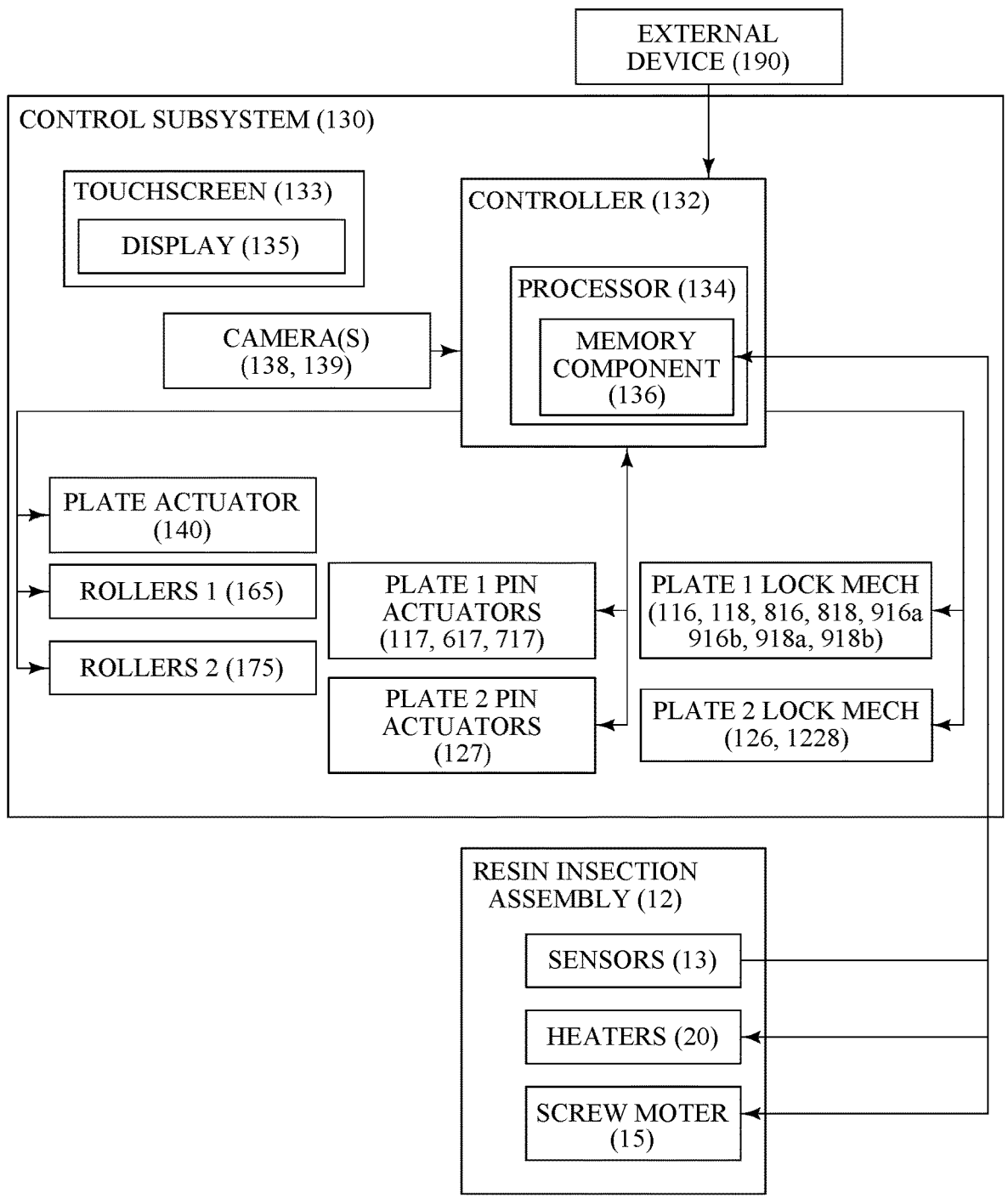
FIG. 13 is a schematic diagram of a control subsystem for use in the injection molding system of FIG. 1.

FIG. 13 is a schematic diagram of the control subsystem 130.

Referring now to FIG. 13, in this exemplary embodiment, the control subsystem 130 can be characterized as forming part of the molding subsystem 100. The control subsystem 130 includes a controller 132 which, in this exemplary embodiment, is operably connected to: the first plurality of actuators 117; the second plurality of actuators 127; the locking mechanism 116, 118 for the first plate 110; the locking mechanism 126, 128 for the second plate 120; the plate actuator 140; the motor 165 for driving rotation of the first pair of spools 166a, 166b; and the motor 175 for driving rotation of the second pair of spools 176a, 176b, such that the controller 132 can communicate instructions (signals) to selectively activate and regulate operation of such components or subsets thereof. In this exemplary embodiment, the first plurality of actuators 117 and the second plurality of actuators 127 are configured to obtain readings relating to the positioning of the respective pins of the first plurality of pins 114 and the second plurality of pins 124, respectively, in the first axial direction. The controller 132 is configured to receive and process such readings and control operation of various components of the molding subsystem 100 based thereon, as further described below.

Referring still to FIG. 13, the controller 132 includes a processor 134 for executing instructions (routines) stored in a memory component 136 or other computer-readable medium to perform the various operations of the controller 132 described herein. It should thus be appreciated that each operation of the controller 132, or the control subsystem 130 generally, described herein corresponds to a set of instructions stored in the memory component 136 which can be executed by the processor 134 to cause the controller 132 to perform the operation, unless otherwise specified. Furthermore, while the processor 134 and the memory component 136 of the controller 132 is generally referred to herein in singular form, it should be appreciated that, in some embodiments, the molding subsystem 100 may include multiple controllers and/or the controller 132 may include multiple processors and memory components which are utilized in the execution of the controller 132 operations described herein.

Referring now to FIGS. 1 and 13, in this exemplary embodiment, the control subsystem 130 also includes one or more cameras 138, 139 configured to acquire images of the first molding surface 110*a* and the second molding surface 120*a*. Specifically, in this embodiment, the control subsystem 130 includes two cameras: a first camera 138, which is positioned so that the field of view of the first camera 138 includes the first molding surface 110*a* (as indicated by the dashed lines extending from the first camera 138 in FIG. 1); and a second camera 139, which is positioned so that the field of view of the second camera 139 includes the second molding surface 120*a* when the reconfigurable mold 105 (as indicated by the dashed lines extending from the second camera 139 in FIG. 1). The first camera 138 and the second camera 139 are each operably connected to the controller 132, such that images captured by the first camera 138 and the second camera 139 are transmitted to the controller 132 for subsequent processing, the importance of which is further described below. Suitable cameras for use in the vision and control subsystem 130 include digital optical or fluorescent cameras with resolution sufficient of identify the head 114*b* of each pin.

Figure 11:
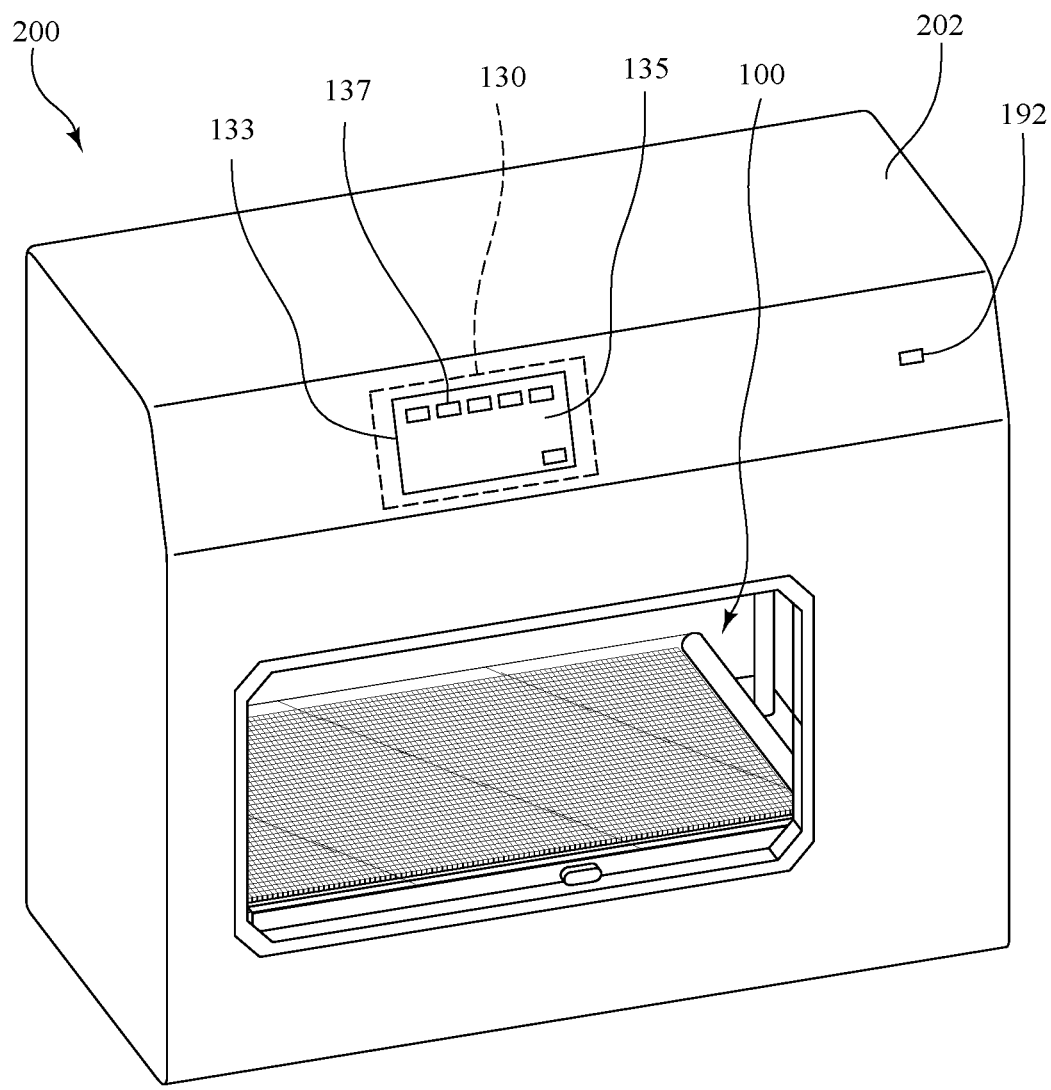
FIG. 11 is a perspective view of the exemplary molding subsystem of FIG. 1 implemented within a desktop workstation.

FIG. 11 is a perspective view of the exemplary molding subsystem 100 implemented within a desktop workstation.

Figure 12:
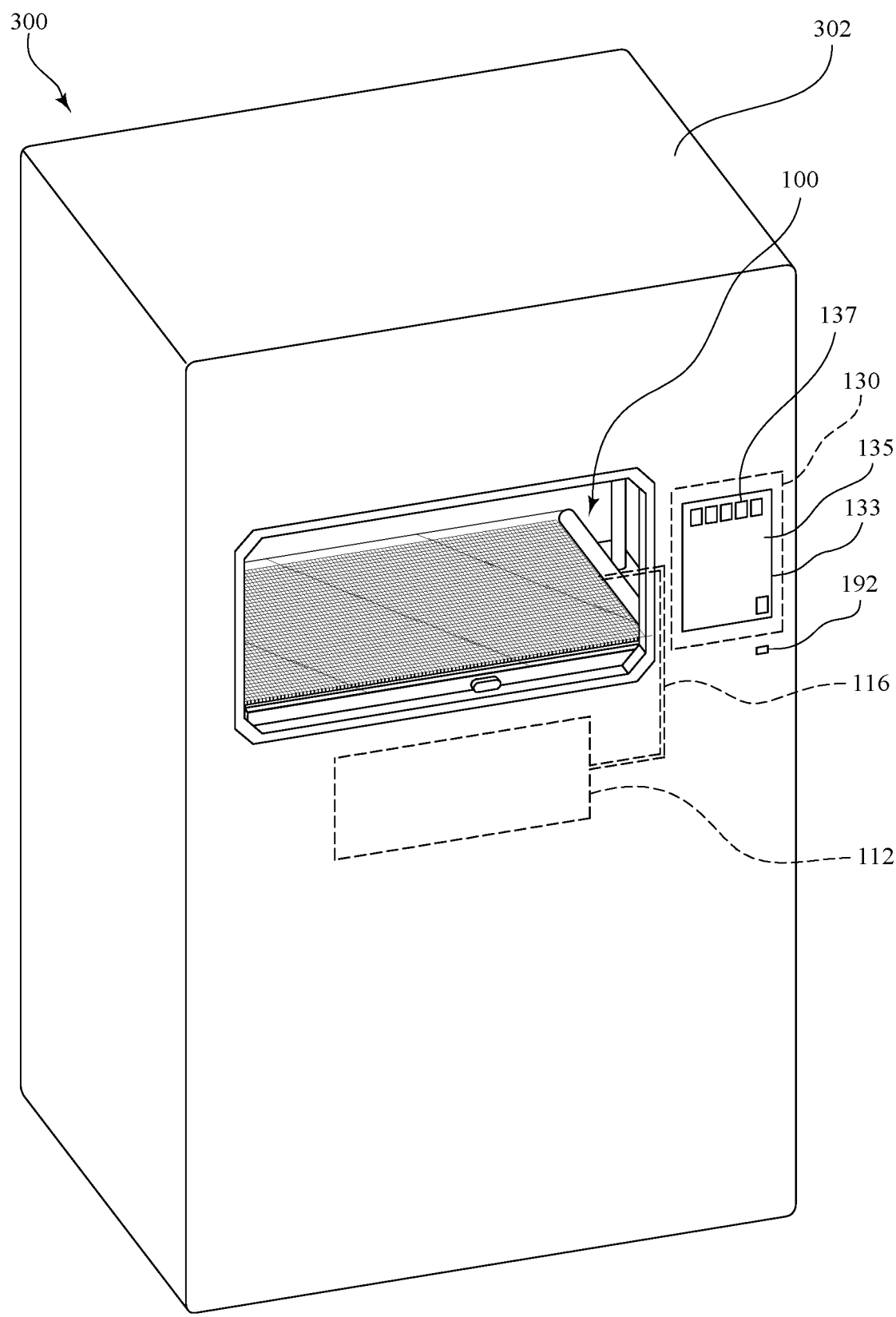
FIG. 12 is a perspective view of the exemplary injection molding system of FIG. 1 implemented within a kiosk.

FIG. 12 is a perspective view of the exemplary molding subsystem 100 implemented within a kiosk.

Referring now to FIGS. 11-13, in this exemplary embodiment, the control subsystem 130 also includes a display 135 configured to display a graphical user interface (GUI) 137 (FIGS. 11 and 12) enabling users to interact with and/or control certain operation of the molding subsystem 100 and/or other information communicated to the display 135 from the controller 132. In some embodiments, users may engage with the GUI 137 to: facilitate the uploading of input data (e.g., a CAD model .stl file) corresponding to a three-dimensional model of an article for subsequent conversion and use in the manner described below; enable user-controlled activation and/or deactivation of the first plurality of actuators 117, the second plurality of actuators 127, the locking mechanism 116, 118 for the first plate 110, the locking mechanism 126, 128 for the second plate 120, the plate actuator 140, the first pair of spools 166*a*, 166*b*, the second pair of spools 176*a*, 176*b*; and/or enable users to control or monitor certain components of the resin injection assembly 12. In this exemplary embodiment, the display 135 is a component of a touchscreen device 133 which is configured to receive and transmit user selections resulting from user interaction with the GUI 137 to the controller 132 for subsequent processing. To this end, the touch screen device 133 to which the display 135 is a part may include one or more touch sensors and/or a processor and memory component to receive, process, and transmit user input to the controller 132. Accordingly, in this exemplary embodiment, the touchscreen device 133 to which the display 135 is operably connected to the controller 132, such that information can be both communicated to and received from the controller 132. Alternative embodiments are, however, contemplated in which the display 135 is not a component of a touch screen device 133, but, rather, is merely configured to display information (e.g., the GUI 137) received from the controller 132. In such embodiments, peripheral devices, such as a keyboard and/or mouse operably connected to the controller 132 may be used to facilitate user interaction with the GUI 137.

Referring still to FIGS. 11-13, in some implementations, the molding subsystem 100 may be implemented in either a desktop workstation 200 (FIG. 11) or a kiosk 300 (FIG. 12). As shown, the desktop workstation 200 includes an exterior housing 202 of sufficient dimension to accommodate only the molding subsystem 100 of the injection molding system 10 therein, whereas the kiosk 300 includes an exterior housing 302 of sufficient dimension to accommodate both the resin injection assembly 12 (which is indicated in dashed lines in FIG. 12) and the molding subsystem 100 therein. To facilitate the uploading of input data to the controller 132 of the control subsystem 130 (which is indicated in dashed lines in FIGS. 11 and 12), both the desktop workstation 200 and the kiosk 300 can include an interface 192 which can be utilized to operably connect an external device 190 (FIG. 13) to the controller 132 of the control subsystem 130, such that input data corresponding to an article 50 intended for manufacture can be communicated from the external device 190 to the controller 132 for subsequent processing. In this regard, the interface 192 can include: one or more ports (e.g., a universal serial bus (USB) port and/or memory card slot) configured to receive a transferable media device, such as a flash device or secure digital (SD); and/or more ports configured to receive wired connection means (e.g., Ethernet cable, USB cable, IEEE 1394, etc.) which can be used to connect an external computing device. Additionally, or alternatively, the control subsystem 130 may include the necessary hardware components (e.g., Bluetooth® chip, router, etc.) needed to facilitate wireless communication between the controller 132 and an external device 190, such as a personal computer or tablet. Alternative embodiments are also contemplated in which input data corresponding to an article 50 intended for manufacture is stored locally on the controller 132, thereby alleviating the need for the external device 190 and interface 192.

Referring now again specifically to FIG. 13, in this exemplary embodiment, the control subsystem 130 is also configured to receive information from and control certain operations of the resin injection assembly 12. Specifically, in this exemplary embodiment, the controller 132 of the control subsystem 130 is operably connected to the one or more sensors 13 of the resin injection assembly 12, such that readings obtained by the one or more sensors 13 are transmitted to the controller 132 for subsequent processing. In some implementations, the readings obtained by the controller 132 from the one or more sensors 13 of the resin injection assembly 12 may be communicated to the display 135 so that an operator of the injection molding system 10 can monitor the resin injection assembly 12. The controller 132 is also operably connected to the one or more heaters 20 and the motor 15 responsible for driving rotation of the screw 18, such that the controller 132 can communicate instructions (signals) which affect operation of the one or more heaters 20 and/or motor 15. As a result of such configuration, the controller 132 can, e.g., in response to receiving readings from the one or more sensors 13 indicating that the heat or flow rate of the resin 11 within the reservoir 16 is below a predetermined value, communicate instructions which cause the temperature of the one or more heaters 20 to increase or the motor 15 to increase the rotation rate of the screw 18. In alternative embodiments, the resin injection assembly 12 may be provided with its own controller that is separate from the controller 132 of the control subsystem 130 of the molding subsystem 100.

Figure 14:
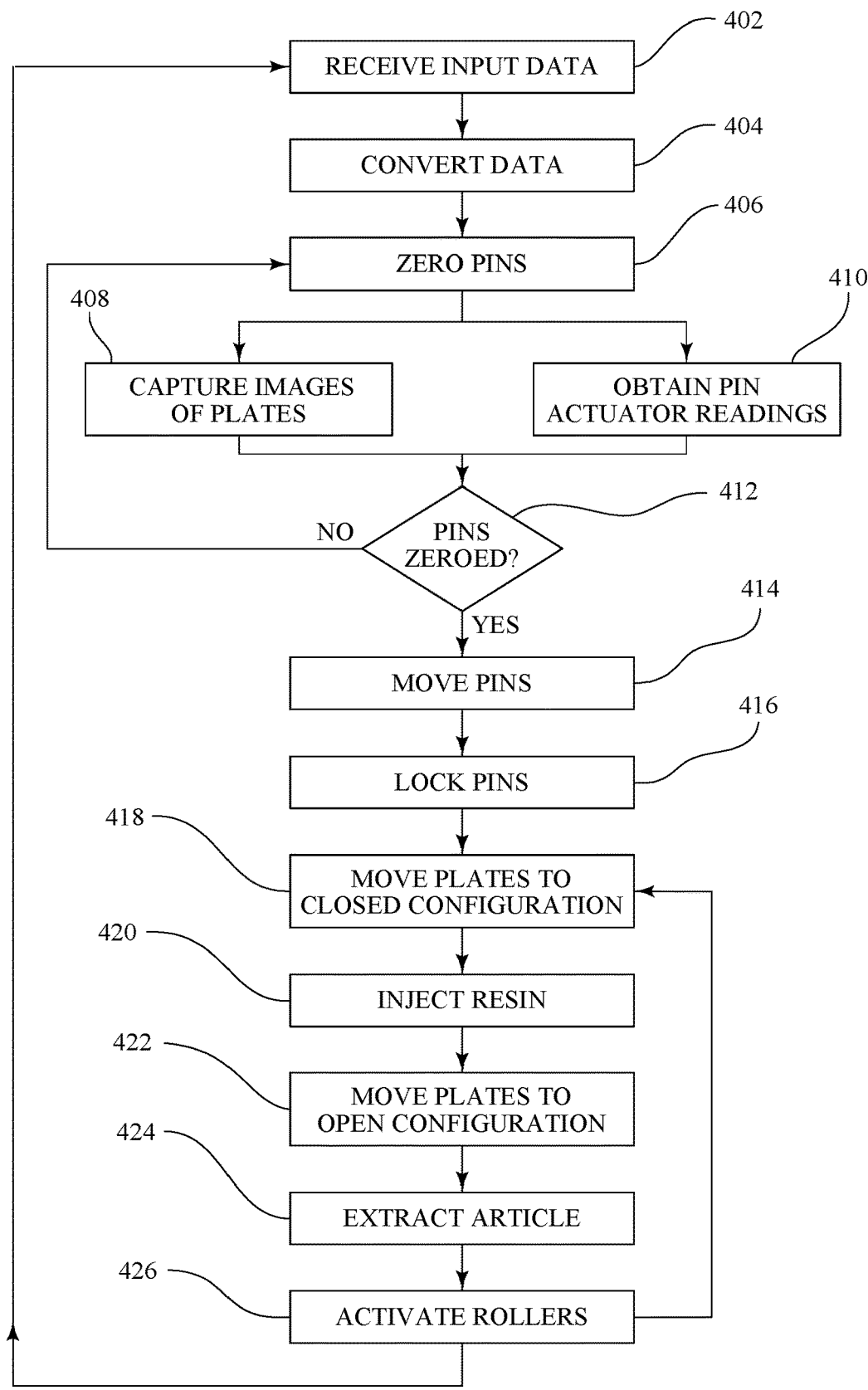
FIG. 14 is a flow chart of an exemplary routine for manufacturing an article using the injection molding system of FIG. 1.

FIG. 14 is a flow chart of an exemplary molding routine for manufacturing an article using the injection molding system 10.

Referring now to FIGS. 1, 2A-2D, 3A, 3B, 5, 13, and 14, in this implementation, the exemplary molding routine commences by the controller 132 of the control subsystem 130 receiving input data (e.g., as embodied in a computer-aided design (CAD) file) corresponding to a digital model of an article 50 intended to be manufactured, as indicated by block 402 in FIG. 14. The input data received by the controller 132 is processed and converted by the controller 132 into a specifically formatted file (or converted file), as indicated by block 404 in FIG. 14. The converted file contains data which associates the various surfaces of the article 50 intended for manufacture and reflected in the initial input data received by the controller 132 with pins of the reconfigurable mold 105. In this regard, the controller 132 may be characterized as effectively "mapping" the initial input data to the first plurality of pins 114 of the first plate 110 and the second plurality of pins of 124 of the second plate 120, and the converted file may be characterized as including "coordinates" which effectively indicate which of the first plurality of pins 114 and the second plurality of pins 124 need to be moved in the first axial direction and to what extent. In this regard, each coordinate within the converted file may be characterized as including Boolean (true/false) data indicating whether the pin to which the coordinate corresponds should be moved in the first axial direction from a zeroed position and a numerical value which indicates the extent to which the pin to which the coordinate corresponds should be moved in the first axial direction. In this particular implementation, the latter value corresponds to an electromotive force (EMF) value (in e.g., volts per meter (V/m)). As further described below, the EMF values of the coordinates embodied in the converted file can be processed by the controller 132 to determine the extent to which actuators in the first plurality of actuators 117 and the second plurality of actuators 127 need to be activated in order to move the first plurality of pins 114 and the second plurality of pins 124 in the first axial direction so that the first molding surface 110a and the second molding surface 120a match the contours of the model embodied in the initial input received by the controller 132 and form a sprue 107. The maximum position of each pin corresponds to the furthest distance to which the head 114b of the pin can be moved away from the frame to which it corresponds. Conversely, the minimum position of each pin corresponds to the shortest distance the head 114b of the pin can be moved away from the frame to which it corresponds. In this regard, the maximum positon may correspond to the uppermost bound of possible EMF values and the minimum position may correspond to the lowermost bound of possible EMF values.

In one exemplary embodiment and implementation, to facilitate conversion of the input data to the converted file, the controller 132 is equipped with system software, and, more specifically, computer-aided-design (CAD) to computer-aided manufacturing (CAM) software (or CAD-to-CAM software) written, e.g., in Python or another suitable programming language, which enables the controller 132 to perform the conversion operations described herein. In response to receiving input data in the form of a CAD file (e.g., a stereolithography or (.stl file), the controller 132 reads the CAD file and generates a mesh model based on the CAD file. In addition to the mesh model, the controller 132 also generates a model for the pins of each plate utilized in the reconfigurable mold (or a pin model). In the pin model, the pins are modeled with a designated length, diameter, and shape which corresponds to the pins of the plate of the reconfigurable mold to which the pins correspond. The pin model also accounts for the degree of separation, if any, between adjacently positioned pins in each plate. Following generation of the mesh model, the CAD file is read and the mesh model is provided with a bounding box with six sides (or faces). Coordinates corresponding to the mesh model are obtained and converted so that the each coordinate of the mesh model corresponds to the first quadrant of a three-dimensional coordinate system, thereby ensuring that values corresponding only to positive pin movement in the first axial direction are obtained. The mesh model and the pin model are then processed to determine where each pin within the pin model intersects with the mesh model. In this regard, the pins of each respective plate within the pin model are divided into sections, and each pin within each respective section intersects with a face of the mesh model. The intersection point of each respective pin within the pin model with a face of the mesh model is determined and utilized to set the x and y coordinates of the pin, which correspond to the positioning of the pin within the plurality of pins of the plate to which it corresponds, and the z coordinate of the pin, which represents the extent to which the pin needs to move in the first axial direction to get to the top of the mesh model at the intersection point. As the x, y, and z coordinates of the pins within the pin model are set in the above-described matter, a list of pin objects and the x, y, and z values corresponding thereto are maintained and written into a comma-separated-values (CSV) file, which, in this particular implementation serves as the converted file.

It should also be appreciated that, as used herein, the terms "specifically formatted file", "converted file", as well as grammatical equivalents thereof, are not limited to any particular file type, but, rather, refer to any digitized collection of the coordinate data and information described above which can be received and processed by the controller 132 in the manner described herein.

Referring now again specifically to FIG. 13, the controller 132 is equipped with system software (i.e., a module of instructions stored on the memory component 136), which, when executed by the controller 132 cause the input data to be converted in the manner described herein. In some embodiments, such system software is designed so that it can be integrated with existing CAD software programs. For instance, in some embodiments and implementations, the system software may act as a plugin which can be implemented within and used with a CAD software program installed on the controller 132. In some implementations, converted files generated by the controller 132 may be stored in whole or in part in the memory component 136 of the controller 132 for subsequent access by the controller 132 and use in the molding subsystem 100.

Referring now to FIGS. 2A, 13, and 14, prior to select actuators of the first plurality of actuators 117 and/or select actuators of the second plurality of actuators 127 being activated, in this implementation, the first plurality of pins 114 and the second plurality of pins 124 are placed in a zeroed configuration, as indicated by block 406 in FIG. 14. As evidenced by the first plurality of pins 114 of the first plate 110 in FIG. 2A, in this implementation, when zeroed, the top 114c of each respective pin of the first plurality of pins 114 reside along a common plane. Similarly, when zeroed, the top of each respective pin of the second plurality of pins 124 also reside along a common plane when zeroed. To facilitate zeroing of the first plurality of pins 114 and the second plurality of pins 124, the controller 132 may communicate instructions which deactivate each actuator of the first plurality of actuators 117 and the second plurality of actuators 127, thus allowing each pin of the first plurality of pins 114 and the second plurality of pins 124 to fall by the force of gravity to a resting position. Of course, if the first plurality of pins 114 and the second plurality of pins 124 are already known to be in the zeroed configuration, e.g., if the molding subsystem 100 is initialized for an initial use after being powered off, then the step indicated in block 406 may be skipped.

Referring now to FIGS. 1, 2A, 13, and 14, in this implementation, the exemplary molding routine includes a subroutine for verifying the first plurality of pins 114 and the second plurality of pins 124 are in the zeroed configuration, as indicated by blocks 408 and 410 and decision 412 in FIG. 14. The subroutine commences by each actuator of the first plurality of actuators 117 and the second plurality of actuators 127 providing a reading relating to the positioning of the pin to which the actuator corresponds, as indicated by blocks 408 and 410 in FIG. 14. The readings obtained from the first plurality of actuators 117 and the second plurality of actuators 127 are then transmitted to the controller 132. The controller 132 then utilizes such information to verify that the first plurality of pins 114 and the second plurality of pins 124 are in the zeroed configuration, as indicated by decision 412 in FIG. 14.

Referring still to FIGS. 1, 2A, 3A, 3B, 5, 13, and 14, to verify zeroing based on the readings obtained from the first plurality of actuators 117 and the second plurality of actuators 127, the controller 132 assesses the readings to verify that none of the actuators in either the first plurality of actuators 117 or the second plurality of actuators 127 are activated. In this particular embodiment and implementation, each actuator of the first plurality of actuators 117 and the second plurality of actuators 127 is configured to provide EMF readings (e.g., volts per meter (V/m)), which are indicative of the electrical current applied to the first wound coil 117a, the second wound coil 117b, and/or the third wound coil 117c of the actuator at a given time, and thus the EMF applied to the pin corresponding to the actuator. As such, in this implementation, the controller 132 analyzes the readings of each respective actuator of the first plurality of actuators 117 and the second plurality of actuators 127 to verify that each actuator is producing a reading of zero, indicating that no electrical current is being applied to either the first wound coil 117a, the second wound coil 117b, and/or the third wound coil 117c and thus that the actuator is not activated (or deactivated). Upon determining that any actuator of the first plurality of actuators 117 is activated, the controller 132 will determine that the first plurality of pins 114 is not zeroed. Similarly, upon determining that any actuator of the second plurality of actuators 127 is activated, the controller 132 will determine that the second plurality of pins 124 is not zeroed.

Referring now specifically to FIG. 14, upon the controller 132 determining that the first plurality of pins 114 and the second plurality of pins 124 are not zeroed based on either the images obtained by the first camera 138 and the second camera 139 or the readings obtained by the first plurality of actuators 117 and the second plurality of actuators 127, the controller 132 will communicate instructions which cause the steps corresponding to blocks 406, 408, and 410, and decision 412 to be repeated, at least with respect to the plurality of pins determined not to be zeroed. That is, if the controller 132 determines that the first plurality of pins 114 are not zeroed while the second plurality of pins 124 are determined to be zeroed, or vice versa, the steps corresponding to blocks 406, 408, and 410, and decision 412 will be repeated only for the plurality of pins determined not to be zeroed.

Additionally or alternatively, in some embodiments and implementations, the zeroing of the first plurality of pins 114 and the second plurality of pins 124 may be based on images obtained by the first camera 138 and the second camera 139. To verify zeroing, the controller 132 assesses such images to verify: (i) the top 114c of each respective pin of the first plurality of pins 114 reside along a common plane and each respective pin of the second plurality of pins 124 reside along a common plane as each other; and (ii) that the top 114c of each pin the first plurality of pins 114 is positioned at or above a predetermined plane in the first axial direction (e.g., relative to the first frame 112) and that the top of each respective pin of the second plurality of pins 124 is positioned at or extends below a predetermined plane in the first axial direction (e.g., relative to the second frame 122). If the controller 132 is unable to verify that both of the above conditions are satisfied for the first plurality of pins 114, the controller 132 will determine that the first plurality of pins 114 are not zeroed. Similarly, if the controller 132 is unable to verify that both of the above conditions are satisfied for the second plurality of pins 124, the controller 132 will determine that the second plurality of pins 124 are not zeroed. Alternative implementations are contemplated, however, in which only one of the above two conditions must be satisfied for the controller 132 to determine the pins are zeroed based on the images obtained by the first camera 138 and the second camera 139.

Referring now to FIGS. 2A, 2B, 3A, 3B, 5, 13, and 14, upon determining that the both the first plurality of pins 114 and the second plurality of pins 124 are zeroed, the controller 132 proceeds to process the converted file generated in the step corresponding to block 404 in FIG. 14 and communicates instructions (signals) which activate select actuators of the first plurality of actuators 117 (which, depending on the article intended for manufacture, may include some or all of the first plurality of actuators 117) and select actuators of the second plurality of actuators 127 (which, depending on the article intended for manufacture may include some or all of the second plurality of actuators 127) based on the coordinates embodied in the converted file, as indicated by block 414 in FIG. 14. In other words, the controller 132 processes the converted file and activates select actuators of the first plurality of actuators 117 and the second plurality of actuators 127 as to move the first plurality of pins 114 and the second plurality of pins 124 in the first axial direction in a manner which causes the first molding surface 110a and the second molding surface 120a to correspond to the various surfaces of the article 50 embodied in the initial input data received by the controller 132 and to form the sprue 107. In this regard, the controller 132 processes the converted file to determine which actuators of the first plurality of actuators 117 and the second plurality of actuators 127 need to be activated as well as the extent to which such actuators need to be activated (i.e., which wound coils of such actuators should be provided with electrical current and with what voltage) based on the coordinate information within the converted file. In determining the extent to which each actuator needs to be activated, the EMF value of the coordinate information of the pin corresponding to the actuator is input into an algorithm to determine the current potentials needed to move the pin corresponding to the actuator in the first axial direction (i.e., determine which of the first wound coil 117a, the second wound coil 117b, and the third wound coil 117c of the actuator should be supplied with electrical current and in what voltage) based on the inputted EMF value. As the positioning of each pin relative to the actuator to which it corresponds is proportional to the power input (i.e., the electrical current supplied to the actuator), the algorithm may utilize Faraday's law, Lenz's law, and associated equations in determining the current potentials needed. Based on such determination, the controller 132 communicates instructions (signals) which activate select actuators of the first plurality of actuators 117 and the select actuators of the second plurality of actuators 127 to move the pins of the first plurality of pins 114 and the pins of the second plurality of pins 124 corresponding thereto to an initial position in the first axial direction.

Figure 2C:
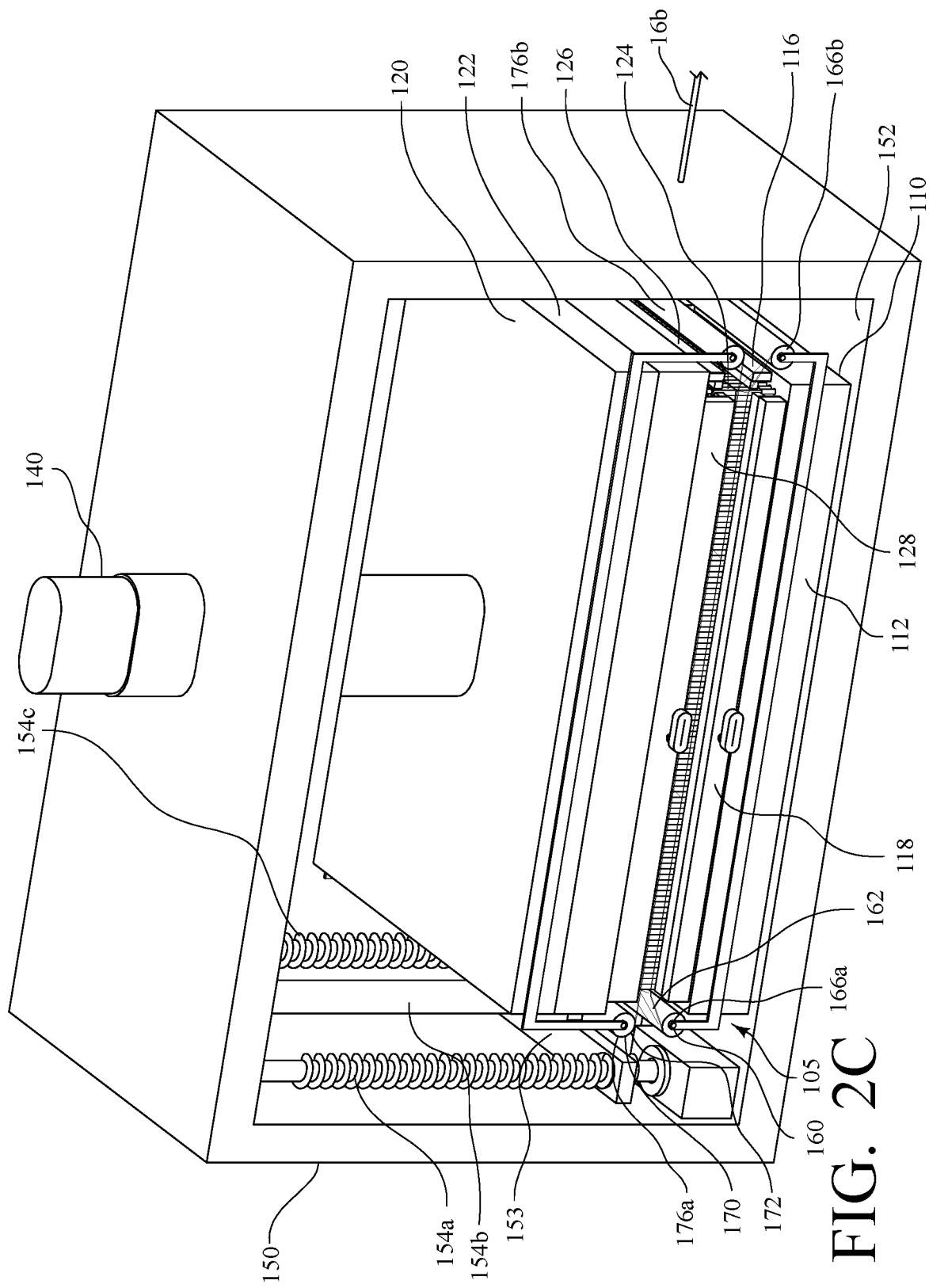
FIG. 2C is another perspective view of the reconfigurable mold similar to FIG. 2A, but with the reconfigurable mold in a closed, non-zeroed configuration.

As shown in FIGS. 2B and 2C, in this particular implementation, the actuators of the first plurality of actuators 117 corresponding to those pins of the first plurality of pins 114 which will ultimately contact corresponding pins of the second plurality of pins 124 when the reconfigurable mold 105 is closed are activated as to cause such pins to move to a max position (i.e., electrical current is supplied to the first wound coil 117a, the second wound coil 117b, and the third wound coil 117c of such actuators). As shown in FIG. 2B, in this implementation, the actuators of the first plurality of actuators 117 corresponding to most of the pins of the first plurality of pins 114 corresponding to the surfaces of the bottom half of the article 50 and sprue 107 are activated as to cause those pins to be moved in the first axial direction to a lesser degree (e.g., current may be supplied to the second wound coil 117b and/or the third wound coil 117c, but not the first wound coil 117a of such actuators). Although not readily visible in FIG. 2B, in this particular implementation, only the actuators of the second plurality of actuators 127 corresponding to the pins of the second plurality of pins 124 corresponding to the surfaces of the upper half of the article 50 intended for manufacture will be activated. This is because the actuators of the second plurality of actuators 127 corresponding to the pins of the second plurality of pins 124 which will ultimately contact corresponding pins of the first plurality of pins 114 (FIG. 2C) when the reconfigurable mold 105 is closed and are already in a max position when zeroed.

Following the initial positioning of the first plurality of pins 114 and the second plurality of pins 124 in the first axial direction, the controller 132 obtains EMF readings from the first plurality of actuators 117 and the second plurality of actuators 127 to verify that the pins of the reconfigurable mold 105 are in the appropriate position to form the article 50 intended for manufacture. In this regard, the EMF readings provided by the first plurality of actuators 117 and the second plurality of actuators 127 are compared to the EMF values of the coordinates embodied in the converted file to determine whether the first plurality of pins 114 and the second plurality of pins 124 are properly positioned in the first axial direction. If the EMF readings obtained from an actuator of the first plurality of actuators 117 or the second plurality of actuators 127 do not match the corresponding EMF value within the converted file, the controller 132 will communicate instructions (signals) which cause either additional or fewer wound coils of the actuator to be provided with electrical current or the voltage of current supplied to a particular wound coil(s) of the actuator to be increased or decreased to adjust the positioning of the pin corresponding thereto in the first axial direction as needed. In some implementations additional images captured by the first camera 138 and the second camera 139 may additionally or alternatively be utilized (i.e., processed by the controller 132) to verify the first plurality of pins 114 and the second plurality of pins 124 are correctly positioned in the first axial direction.

Referring now to FIGS. 2A, 2B, 13, and 14, once the controller 132 verifies the each pin of the first plurality of pins 114 and the second plurality of pins 124 is in the correct position in the first axial direction, the locking mechanism 116, 118 for the first plate 110 and the locking mechanism 126, 128 of the second plate 120 are activated to transition from the unlocked configuration (FIGS. 2A and 4A) to the locked configuration (FIGS. 2B and 4B) to hold the first plurality of pins 114 and the second plurality of pins 124 in a fixed position, as indicated by block 416 in FIG. 14. As noted above, in this particular embodiment and implementation, the locking mechanism 116, 118 for the first plate 110 is configured to be transitioned to the locked configuration by manually rotating the handle 116c of the first locking mechanism 116 and the handle 118c of the second locking mechanism 118. Similarly, the locking mechanism 126, 128 for the second plate 120 is configured to be transitioned to the locked configuration by manually rotating the handle of the third locking mechanism 126 and the handle of the fourth locking mechanism 128 manually. Of course, in embodiments in which the locking mechanism 116, 118 for the first plate 110 and the locking mechanism 126, 128 for the second plate 120 are automated, instead of manually locking the locking mechanism, the controller 132 can communicate instructions (signals) which activate and cause the motors associated with the locking mechanism 116, 118 for the first plate 110 and the locking mechanism 126, 128 for the second plate 120 to transition the locking mechanisms to the locked configuration, as reflected by the connection between the controller 132 and the locking mechanisms 116, 118, 126, 128 for the first plate 110 and the second plate 120 in FIG. 13.

Referring now to FIGS. 1, 2B, 2C, 13, and 14, once the locking mechanism 116, 118 for the first plate 110 and the locking mechanism 126, 128 for the second plate are in the locked configuration, in order to reduce the energy consumption demands of the molding subsystem 100, the controller 132 communicates instructions (signals) which cause each actuator of the first plurality of actuators 117 and the second plurality of actuators 127 to be deactivated. At this point, the controller 132 also communicates instructions (signals) which cause the plate actuator 140 to transition the reconfigurable mold 105 from an open configuration (FIG. 2B) to a closed configuration (FIG. 2C), thus forming the cavity 109 in which the article 50 intended for manufacture can be formed, as indicated by block 418 in FIG. 14. Once the reconfigurable mold 105 is in the closed configuration, resin from the resin injection assembly 12 is injected into the reconfigurable mold 105, as indicated by block 420 in FIG. 14. As noted above, in this embodiment and implementation, the resin injection assembly 12 is operably connected to the control subsystem 130, such that the controller 132 can communicate instructions which affect operation of the motor 15 responsible for driving rotation of the screw 18. Accordingly, in this implementation, to inject resin from the resin injection assembly 12, through the sprue 107, and into the cavity 109 defined by the first molding surface 110a and the second molding surface 120a, the controller 132 communicates instructions (signals) which cause the motor 15 to drive rotation of the screw 18, thus urging the liquefied resin 11 through the distal end 16b of the reservoir 16 and into the reconfigurable mold 105.

Figure 2D:
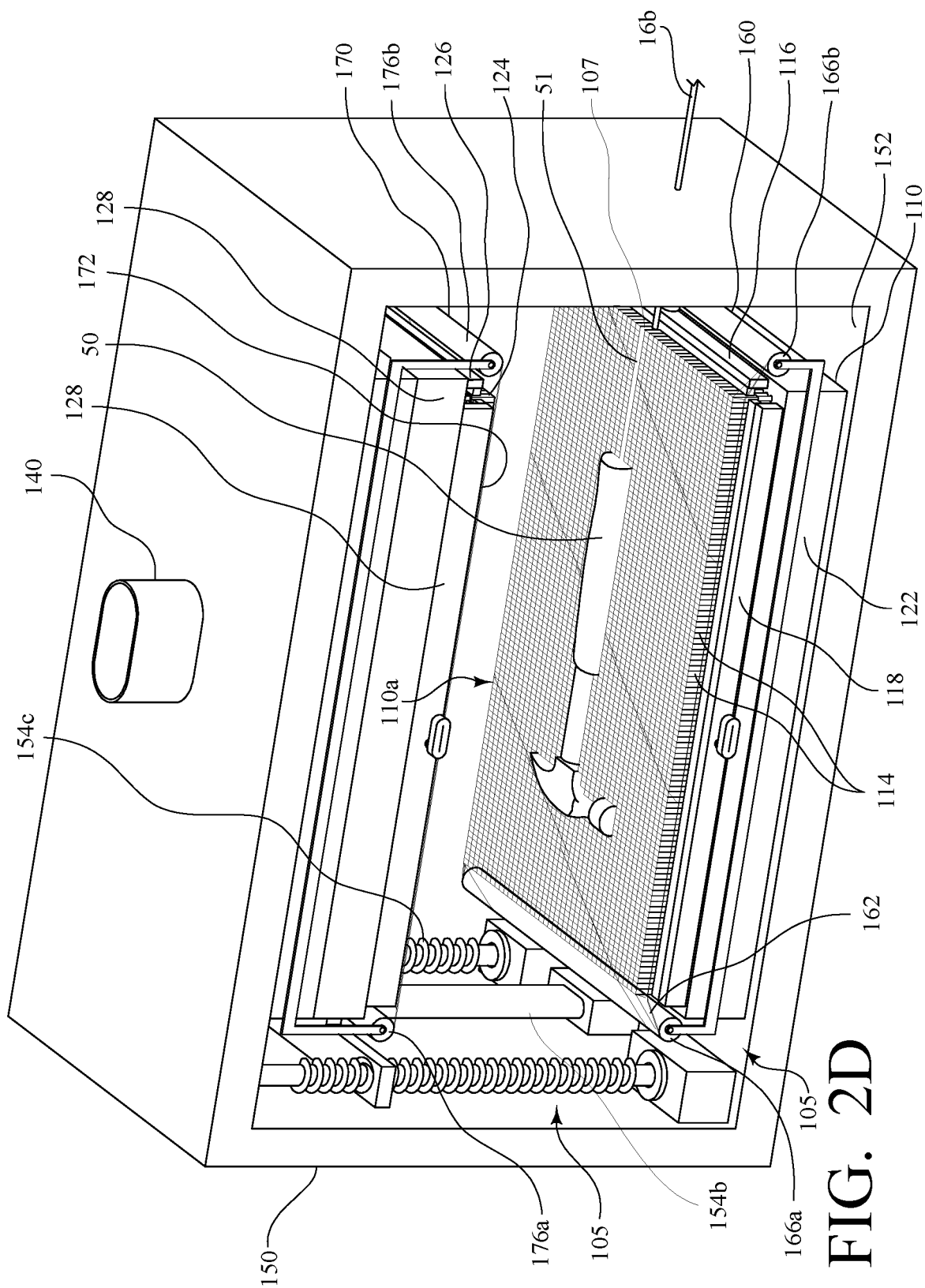
FIG. 2D is another perspective view of the reconfigurable mold similar to FIG. 2A, but with the reconfigurable mold in an open, non-zeroed configuration and supporting a molded article.

Referring now to FIGS. 2C, 2D, 13, and 14, the reconfigurable mold 105 is maintained in the closed configuration and liquefied resin 11 is continuously injected into the reconfigurable mold 105 until the article 50 intended for manufacture is fully formed within the cavity 109. After a predetermined cooling period, the reconfigurable mold 105 is transitioned to the open configuration so that the molded article 50 can be accessed, as indicated by block 422 in FIG. 14. To this end, the controller 132 communicates instructions (signals) which cause the plate actuator 140 to transition the reconfigurable mold 105 from the closed configuration (FIG. 2C) to the open configuration (FIG. 2D). Once the reconfigurable mold 105 is in the open configuration, the formed article 50 can be extracted from the reconfigurable mold 105 and any armatures 51 connected thereto corresponding to the sprue 107 can be removed, as indicated by block 424 in FIG. 14. As indicated by block 426, in this implementation, once the article 50 is removed from the reconfigurable mold, the controller 132 communicates instructions which selectively activate the motor 165 operably connected to the first pair of spools 166a, 166b to wind up the soiled portion of the first membrane 162 (i.e., the portion of the first membrane 162 on which the liquefied resin 11 injected into the reconfigurable mold 105 contacted) and direct a new, clean portion of the first membrane 162 over the first plurality of pins 114. Activation of the motor 165 operably connected to the first pair of spools 166a, 166b and the motor 175 operably connected to the second pair of spools 176a, 176b can occur at any point following removal of the article 50 from the reconfigurable mold 105 and prior to the injection of resin into the reconfigurable mold 105 during a subsequent molding run. In this step, the controller 132 also communicates instructions which selectively activate the motor 175 operably connected to the second pair of spools 176a, 176b to wind up the soiled portion of the second membrane 172 (i.e., the portion of the first membrane 162 on which the liquefied resin 11 injected into the reconfigurable mold 105 contacted) and direct a new, clean portion of the second membrane 172 over the second plurality of pins 124.

Following manufacture of the article 50, additional copies of the article can be made by simply repeating the steps outlined above corresponding to blocks 418, 420, 422, 424, and 426 in FIG. 14, as the first plurality of pins 114 and the second plurality of pins 124 are already locked in the correct position to produce such additional copies. Alternatively, following the manufacture of the article 50 or a copy thereof, new input data corresponding to a digital model of another article intended for manufacture can be provided and the above-described steps corresponding to blocks 402, 404, 406, 408, 410, 414, 416, 418, 420, 424, and 426 and decision 412 repeated to quickly reconfigure the reconfigurable mold 105 and manufacture the new article intended for manufacture. In this way, the molding subsystem 100 of the present invention can facilitate high-volume molding runs of different articles without the need to construct a new mold each time a new article is needed, thereby reducing costs and downtime.

Figure 15:
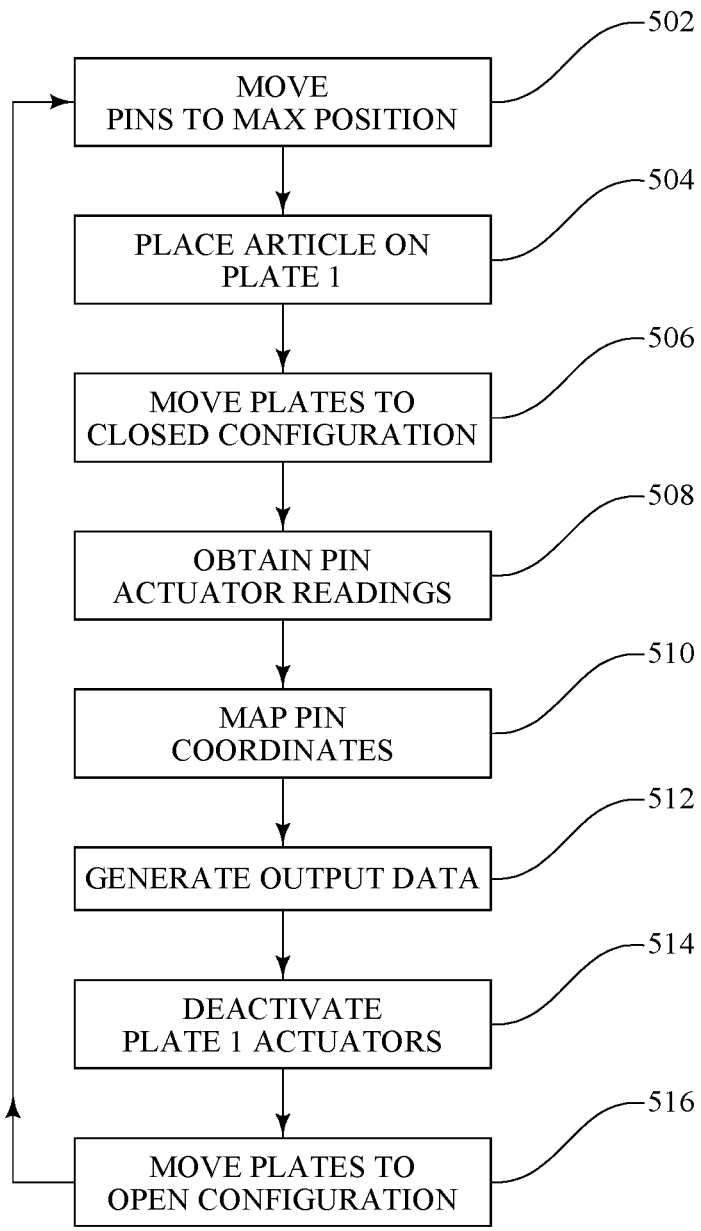
FIG. 15 is a flow chart of an exemplary routine for generating output data corresponding to a three-dimensional model of an article placed in the exemplary molding subsystem of FIG. 1.

FIG. 15 is an exemplary imprinting routine for generating output data corresponding to a digital model of an article placed in the exemplary molding subsystem 100.

Referring now to FIGS. 2A-2D, 3A, 3B, 5, 13, and 15, in this exemplary embodiment, the controller 132 is also equipped with system software (i.e., a module of instructions stored on the memory component 136) which includes an imprinting routine which enables the molding subsystem 100 to take an imprint of an article and generate output data (e.g., a CAD file) corresponding to a digital model of the article with surfaces corresponding to the first molding surface 110a of the first plate 110 and the second molding surface 120a of the second plate 120. The imprinting routine commences by placing the first plurality of pins 114 and the second plurality of pins 124 in a max position, such that the top 114c of each respective pin of the first plurality of pins 114 and the second plurality of pins 124 is as far away from the first frame 112 and the second frame 122 as permitted, respectively, as indicated by block 502 in FIG. 15. As noted above, in this embodiment and implementation, the second plurality of pins 124 are, due to the force of gravity, naturally in a max position when the first plurality of actuators 117 are deactivated. As such, in this implementation, it is only necessary that the first plurality of pins 114 must be moved to the max position when the second plurality of pins 124 are zeroed, which, as described above, can be achieved by carrying out the steps corresponding to blocks 406, 408, and 410 and decision 412 in FIG. 14. To place the first plurality of pins 114 in the max position, the controller 132 communicates instructions which cause each actuator of the first plurality of actuators 117 to be activated to the fullest extent possible, thus supplying the first wound coil 117a, the second wound coil 117b, and the third wound coil 117c of each respective actuator with electrical current.

Referring still to FIGS. 2A-2D, 3A, 3B, 5, 13, and 15, once the first plurality of pins 114 and the second plurality of pins 124 are in the max position, the article for which the generation of output data corresponding to a digital model of the article is desired is placed on the first plurality of pins 114 of the first plate 110, as indicated by block 504 in FIG. 15. Once the article is loaded onto the first plate 110, select pins of the first plurality of pins 114 are lowered from the max position. For example, a hammer could be placed on the first plate 110 to lower the first plurality of pins 114 in the manner reflected in FIG. 2D, except that the pins corresponding to the sprue 107 would not be lowered (as armature 51 would not be present). After the article is loaded onto the first plate 110, the plate actuator 140 is activated to move the reconfigurable mold 105 to the closed configuration, thus causing select pins of the second plurality of pins 124 to move upward from the max position as they come into contact with the article, as indicated by box 506 in FIG. 15. In this regard, the plate actuator 140 is activated in the same manner as described above for the step corresponding to box 418 in FIG. 14. As the select pins of the first plurality of pins 114 are moved downward in response to the article being loaded onto the first plate 110, the controller 132 communicates instructions (signals) which reduce the amount of electrical current being supplied to the first wound coil 117a, second wound coil 117b, and/or third wound coil 117c of the actuators corresponding to such pins so that an accurate EMF reading can be obtained in the step corresponding to block 508 in FIG. 15 described below. Conversely, as the select pins of the second plurality of pins 124 are moved upward, the controller 132 communicates instructions (signals) which cause an amount of electrical current to be supplied to the first wound coil 117a, the second wound coil 117b, and/or the third wound coil 117c of the actuators corresponding to such pins which would be required to hold those pins in such raised (i.e., retracted) position if the article was not pressing against them so that accurate EMF readings can be obtained in the step corresponding to block 508 in FIG. 15 described below.

Referring now specifically to FIGS. 13, 14, and 15, EMF readings are obtained from the actuators of the first plurality of actuators 117 corresponding to the pins of the first plurality of pins 114 lowered from the max position and the actuators of the second plurality of actuators 127 corresponding to pins of the second plurality of pins 124 raised from the max position, as indicated by box 508 in FIG. 15. Such readings are obtained in the same manner as described above for the step corresponding to box 410 in FIG. 14. Once obtained, the controller 132 processes the EMF readings to generate (or map) a set of coordinates (for the first plurality of pins 114 and the second plurality of pins 124)

which include Boolean (true/false) data indicating whether the pin to which the coordinate corresponds is moved in the first axial direction and a numerical value which indicates the extent to which the pin to which the coordinate corresponds is moved in the first axial direction, as indicated by block 510 in FIG. 15. The coordinates generated by the controller 132 can then be processed locally by the controller 132 to generate output data (e.g., a CAD model file, such as an .stl file) corresponding to a three-dimensional model of the article inserted into the molding subsystem 100, as indicated by block 512 in FIG. 15. The output data can then subsequently be read utilizing three-dimensional modeling software and utilized in additive manufacturing applications (e.g., using a 3D printer) to construct the article inserted into the molding subsystem 100. Suitable modeling software which may read and utilize the output data includes, but is not limited to, SOLIDWORKS, FUSION 360, AUTOCAD, Shapr3D, and Maya. Accordingly, the molding subsystem 100 described above with reference to FIGS. 1 and 2A-2D and those subsequently described below are not limited exclusively to injection molding applications, but, rather, may find utility in a wide array of applications in which an article is constructed using one or more molding plates into which a liquid is introduced and allowed to cure into solid form, including, e.g., wax casting, or, as evidenced above, additive manufacturing applications.

Referring now to FIGS. 2C, 2D, 13, 14, and 15, the routine concludes by the controller 132 communicating instructions which cause any activated actuators of the first plurality of actuators 117 and any activated actuators of the second plurality of actuators 127 to be deactivated (i.e., cease the transmission of electrical current to such actuators) and the plate actuator 140 to transition the reconfigurable mold 105 to the open configuration in the same manner as descried above for the step corresponding to block 422 in FIG. 14, as indicated by blocks 514 and 516 in FIG. 15. At this point, the steps corresponding to blocks 502, 504, 506, 508, 510, 512, 514, and 516 can be repeated to generate output data for another article.

Additional, alternative molding subsystem embodiments, in which the first plate 110 and/or the second plate 120 of the reconfigurable mold 105 of the molding subsystem 100 described above with reference to FIGS. 1, 2A-2D, 3A, 3B, and 5 is substituted for a plate of differing construction, are also contemplated herein.

FIGS. 8A and 8B are various partial side views of a first alternative plate construction (or first alternative plate) 610 which may be utilized in place of the first plate 110 and/or the second plate 120.

As shown in FIGS. 8A and 8B, like the first plate 110 and the second plate 120 described above, the first alternative plate 610 also includes: a frame 612 that defines a plurality of channels 613; a plurality of pins 614 which are received in the plurality of channels 613, and a plurality of actuators 617, one of which is provided with reference numerals in FIGS. 8A and 8B, that can be selectively activated to affect the positioning of the plurality of pins 614 in the first axial direction. However, in this exemplary embodiment, each channel of the plurality of channels 613 does not correspond to a series of aligned openings defined across multiple platforms, but, rather, is defined by a single, continuous opening defined by the frame 612, which, in this case, extends from a top surface 612*a* of the frame 612 to a point 612*b* near a bottom surface of the frame 612. As shown, each respective pin of the plurality pins 614 of the first alternative plate 610 is of identical construction as the respective pins of the first plurality of pins 114 described above with reference to FIGS. 1, 2A-2D, 3A, 3B, 4A, 4B, and 5, except that the terminal end of the base of each respective pin of the first plurality of pins 614 defines a platen 614*a*.

Referring now to FIGS. 8A, 8B, and 13, in this exemplary embodiment, instead of solenoids comprising one or more wound coils, each actuator of the plurality of actuators 617 of the first alternative plate 610 includes: a heating element 617*a* deposited beneath one of the channels defined by the frame 612 and a volume of a thermally expandable material 617*b*, such as mercury, deposited within the channel above the heating element 617*a* and below the platen 614*a* of the pin within the channel. As evidenced, e.g., by the wiring 602 shown in FIGS. 8A and 8B, the heating element 617*a* of each actuator is operably connected to the controller 132 of the control subsystem 130, such that the controller 132 can regulate the heat emitted by the heating element 617*a* by communicating instructions (signals) which regulate the voltage of electrical current supplied to the heating element 617*a*.

Referring still to FIGS. 8A, 8B, and 13, as the electrical current supplied to the heating element 617*a* increases, the heat emitted by the heating element 617*a* also increases. As a result, the temperature of the thermally expandable material 617*b* within the channel positioned above the heating element 617*a* is also increased. As the temperature of the thermally expandable material 617*b* increases, the thermally expandable material 617*b* expands within the channel and pushes the platen 614*a* of the pin deposited within the channel, and thus the pin as a whole, in the first axial direction (i.e., away from the frame), as evidenced by viewing FIGS. 8A and 8B in sequence. The platen 614*a* of each respective pin of the plurality of pins 614 is thus substantially the same diameter of the channel in which it is received, such that the platen 614*a* can travel within the channel in the first axial direction, but prevents the thermally expandable material from flowing past the platen 614*a*. In other words, the platen 614*a* blockades the thermally expandable material 617*b*. Accordingly, in this embodiment, each actuator of the plurality of actuators 617 of the first alternative plate 610 is activated by heating the thermally expandable material 617*b*.

Referring still to FIGS. 8A, 8B, and 13, as the heat from the heating element 617*a* decreases in response to the controller 132 communicating instructions (signals) which cause the voltage of electrical current supplied to the heating element 617*a* to decrease or cease altogether, the thermally expandable material 617*b* cools and contracts within the channel, thus lowering the pin back into the channel in the first axial direction, as evidenced by viewing FIGS. 8A and 8B in reverse sequence. In this way, the controller 132 can thus regulate the voltage of electrical current applied to each heating element 617*a* of the plurality of actuators 617 to affect the positioning of the first plurality of pins 614 in the first axial direction in a desired manner (e.g., in accordance with a CAD file or other input data corresponding to a three-dimensional model intended to for manufacture).

Although not shown, it should be appreciated that the first alternative plate 610 will, in practice, typically include more than two channels, pins, and actuators of identical construction and arranged in an array or grid similar to that of the plurality of channels 113, the first and second plurality of pins 114, 124, and the first and second plurality of actuators 117, 127 of the first plate 110 and the second plate 120 described above.

Figure 9:
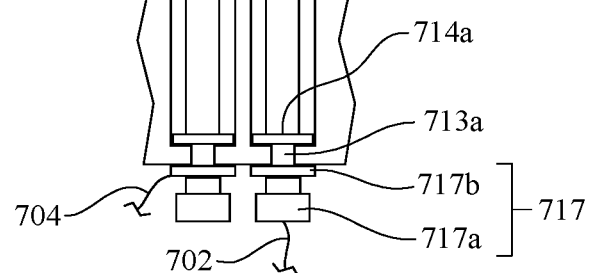
FIG. 9 is a partial side view of a second alternative plate construction.

FIG. 9 is a partial view of a second alternative plate construction (or second alternative plate) 710.

Figure 10:
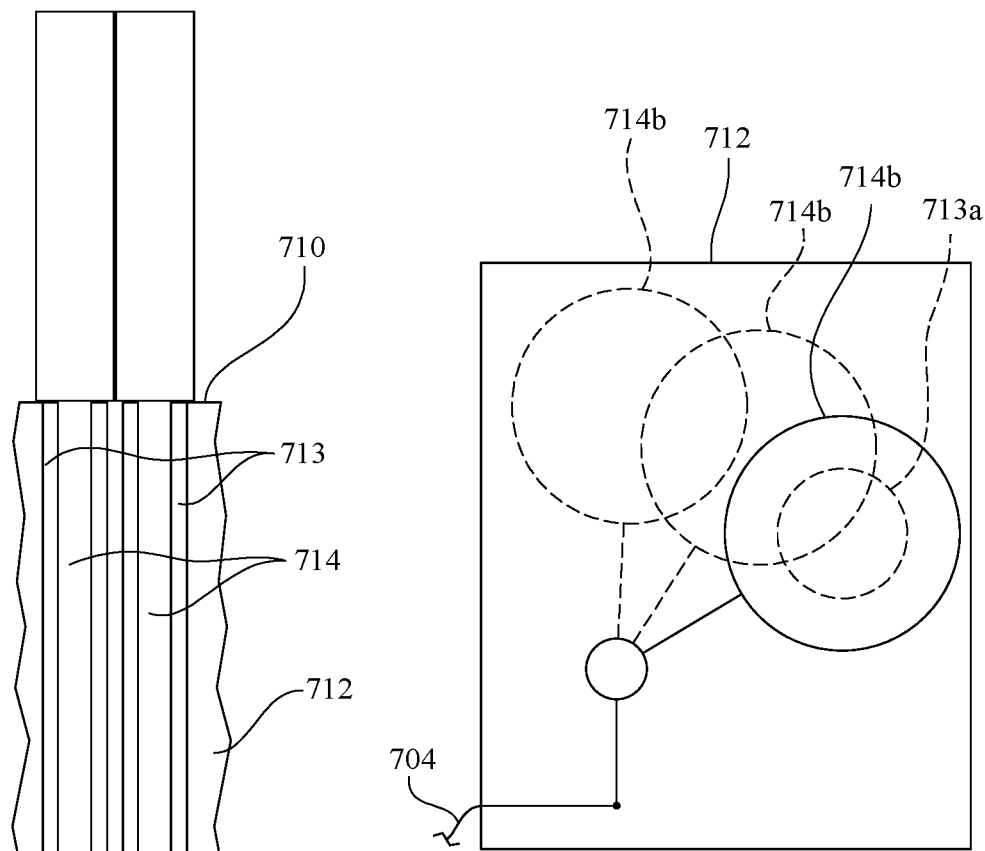
FIG. 10 is a partial bottom view of the second alternative plate construction of FIG. 9, but with a portion of the actuator of the second alternative plate construction removed from view.

FIG. 10 is a partial bottom view of one of the second alternative plate of FIG. 9.

As shown in FIGS. 9 and 10, like the first plate 110 and the second plate 120 described above, the second alternative plate 710 also includes: a frame 712 that defines a plurality of channels 713; a plurality of pins 714 which are received in the plurality of channels 713, and a plurality of actuators 717 (one of which is labeled with reference numerals in FIG. 9) that can be selectively activated to affect the positioning of the plurality of pins 714 in the first axial direction. In this embodiment, each channel of the plurality of channels 713 defined by the frame 712 are of the same construction as the respective channels of the plurality of channels 613 defined by the frame 612 of the first alternative plate 610, except that each channel extends entirely through the frame 712 such that an opening (or port) 713a exists in the bottom of the frame 712. As shown best in FIG. 9, in this embodiment, each pin of the plurality of pins 714 is of identical construction to the respective pins of the plurality of pins 614 of the first alternative plate. As such, the terminal end of the base of each respective pin of the plurality of pins 714 of the second alternative plate 710 also defines a platen 714a that is substantially the same diameter of the channel in which it is received.

Referring now to FIGS. 9, 10, and 13, in this embodiment, each actuator of the plurality of actuators 717 of the second alternative plate 710 includes: an airflow source 717a which is in fluid communication with a channel of the plurality of channels 713 via port 713a, and which can be selectively activated to provide positive airflow into the channel to which it corresponds; and an articulable arm 717b, such as a piezoelectric actuator, which can be selectively activated to transition between a closed configuration fully covering the port 713a corresponding to one of the channels of the plurality of channels 713 (as shown by the solid line representation of the articulable arm 717b in FIG. 10) and an open or partially open configuration in which the articulable arm 717b does not cover or only partially covers the port 713a (as shown by the dashed-line representations of the articulable arm 717b in FIG. 10). In FIG. 10, the airflow source 717a has been removed to better illustrate the operation of the articulable arm 717b relative to the port 713a. The articulable arm 717b can thus be repositioned relative to the port 713a to regulate airflow to the channel to which the articulable arm 717b corresponds. Accordingly, in this embodiment, each actuator of the plurality of actuators 717 of the second alternative plate 710 is considered to be activated when the airflow source 717a is activated to emit a positive flow of air and the articulable arm 717b is activated to be in an open or partially open configuration. As evidenced by wiring 702 in FIG. 9, the airflow source 717a is operably connected to the controller 132 of the control subsystem 130, such that the controller 132 can communicate instructions (signals) which cause the airflow source 717a to emit a positive flow of air into the channel, via port 713a, to which it corresponds.

Referring still to FIGS. 9, 10, and 13, when an actuator of the plurality of actuators 717 is activated, a flow of air enters the channel to which the actuator corresponds. The platen 714a of the pin received within the channel prevents the flow of air from traveling past the platen 714a, causing the flow of air to push the pin in the first axial direction, i.e., away from the frame 712 in a similar manner as the movement of the plurality of pins 614 of the first alternative plate 610 shown in FIGS. 8A and 8B. The extent to which the pin is driven in the first axial direction can thus be adjusted by regulating the amount of positive air entering the channel by adjusting the extent to which the articulable arm 717b covers the opening of the channel. As evidenced by wiring 704 in FIGS. 9 and 10, the articulable arm 717b is also operably connected to the controller 132 of the control subsystem 130, such that the controller 132 can communicate instructions which cause the articulable arm 717b to receive an electrical current and transition between the closed configuration and the open or partially open configuration. To facilitate zeroing of the plurality of pins 714 of the second alternative plate 710, in this embodiment, the default position for each articulable arm 717b (i.e., when no electrical current is directed to the articulable arm 714b) is such that the articulable arm 717b fully covers the port 713a of the channel to which it corresponds. Once the pin is in a desired position as a result of the airflow source 717a being activated and the port 713a to which it corresponds being at least partially uncovered, the pin can be held in such position by transitioning the articulable arm 717b from an open configuration nor partially open configuration back to the closed configuration to prevent air introduced into the channel from inadvertently escaping. At this time, the airflow source 717a can be deactivated to reduce energy demands of the second alternative plate 710. In the event, the pin is moved too far in the first axial direction, the articulable arm 717b can be transitioned back to a partially open configuration to "vent" air from the channel and lower the pin. In this way, the controller 132 can thus regulate operation of the airflow source 717a and the articulable arm 717b to affect the positioning of the plurality of pins 714 in the first axial direction in a desired manner (e.g., in accordance with a CAD file or other input data corresponding to a three-dimensional model intended to for manufacture).

Accordingly, alternative molding subsystems and reconfigurable molds can be constructed by substituting the first plate 110 and/or the second plate 120 of the reconfigurable mold 105 of the molding subsystem 100 described above with reference to FIGS. 1, 2A-2D, 3A, 3B, and 5, for the first alternative plate 610 and/or the second alternative plate 710 described above with reference to FIGS. 8A, 8B, 9, and 10. For instance, in a one (or a first) alternative molding subsystem, the first plate 110 of the reconfigurable mold 105 may be substituted with the first alternative plate 610. In such embodiment, the first alternative molding subsystem can be utilized in conjunction with the resin injection assembly 12 to form an alternative (or first alternative) injection molding system which can be used to mold an article by following a similar routine as that of molding routine described above with reference to FIG. 14, except by mapping the coordinates for the plurality of pins 614 and moving and locking the plurality of pins 614 in a manner which complies with the operational characteristics of the plurality of actuators 617 of the first alternative plate 610 described above. That is, instead of EMF values corresponding to the electrical current which must be applied to the respective wound coils of solenoids, the coordinates for the plurality of pins 614 of the first alternative plate 610 will include information relating to voltages needed to be applied to the heating elements 617a of the plurality of actuators 617 in order to heat the thermally expandable liquid 617b within the plurality of channels 613 in a manner which raises the plurality of pins 614 to a desired position in the first axial direction. Further, instead of applying current to select wound coils of solenoids, the plurality of pins 614 will be moved by virtue of such voltages being applied to the heating elements 617a. In some embodiments, zeroing verification of the plurality of pins 614 may be based exclusively on images obtained by the first camera 138 of the molding surface defined by the plurality of pins 614. Furthermore, in such embodiments, instead of the use of a dedicated locking mechanism to hold the plurality of pins 614 in the desired position in the first axial direction, the plurality of pins 614 may be held in a fixed position (i.e., locked in place) continuously applying electrical current to the heating elements 617a of the plurality of actuators 617. Accordingly, in some embodiments, the first alternative molding subsystem will include each of the components of the molding subsystem 100 described above with reference to FIGS. 1 and 2A-2D, except for the first plate 110 and the locking mechanism 116, 118 for the first plate 110.

In addition to being utilized in combination with the resin injection assembly 12 to mold desired articles, the first alternative molding subsystem can also be utilized to generate output data corresponding to a digital model of an article placed therein.

Figure 16:
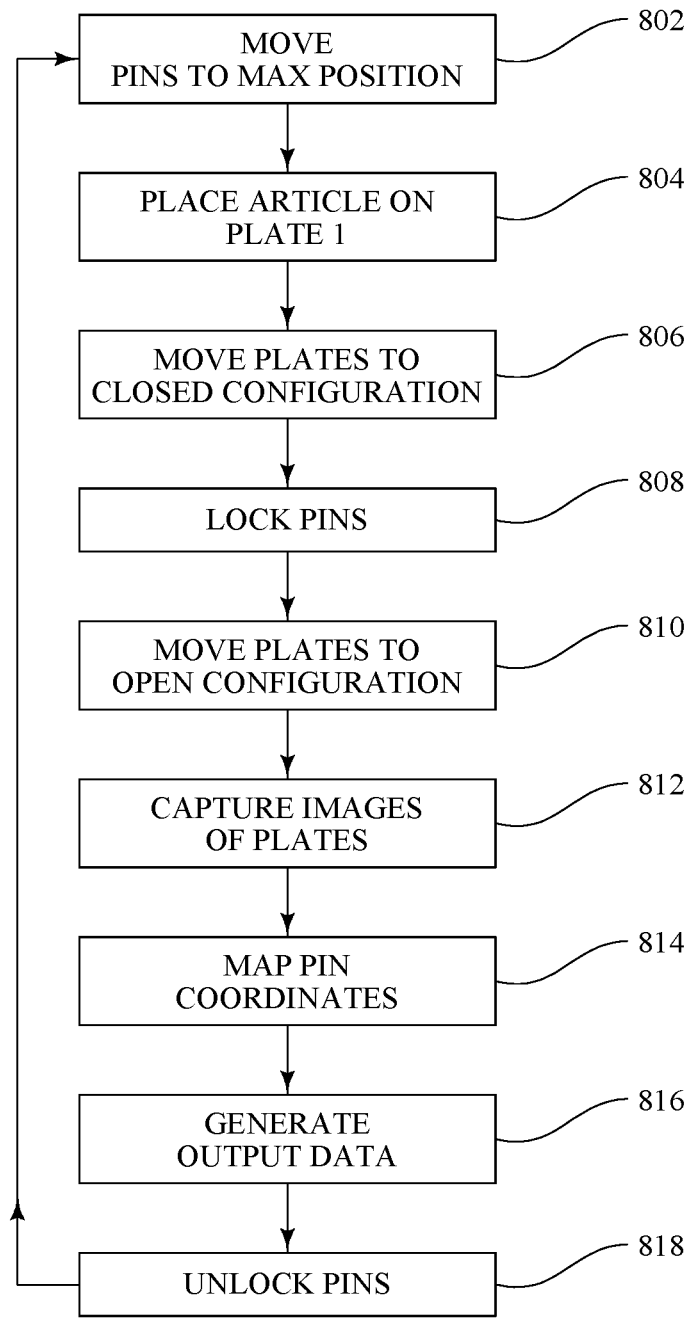
FIG. 16 is a flow chart of another exemplary routine generating output data corresponding to a three-dimensional model of an article placed in an alternative molding subsystem.

FIG. 16 is an alternative imprinting routine for generating output data corresponding to a digital model of an article placed in either the first alternative molding subsystem.

Referring now to FIGS. 1, 2A-2D, 8A, 8B, 13, and 16, in this embodiment, the controller 132 is also equipped with system software (i.e., a module of instructions stored on the memory component 136) which includes an alternative imprinting routine enabling the first alternative molding subsystem to take an imprint of an article and generate output data (e.g., a CAD file) corresponding to a digital model of the article. As shown in FIG. 16, the initial steps of the alternative imprinting routine corresponding to blocks 802, 804, and 806 are identical to the steps corresponding to blocks 502, 504, and 506 in FIG. 15, except that the plurality of pins 614 of the first alternative plate 610 are moved to the max position or otherwise via activation of the plurality of actuators 617 in the manner described above with reference to FIGS. 8A and 8B. In this implementation, once the reconfigurable mold including the first alternative plate 610 and the second plate 120 is placed in the closed configuration via the plate actuator 140, the plurality of pins of each respective plate is locked in place, as shown by block 808 in FIG. 16. In this implementation, the plurality of pins 614 of the first alternative plate 610 are locked in place by continuously applying electrical current in specific voltages to the heating elements 617a of the plurality of actuators 617, while the second plurality of pins 124 of the second plate 120 are locked in place in the same manner as described above, i.e., by transitioning the third locking mechanism 126 and the fourth locking mechanism 128 to the locked configuration.

Referring still to FIGS. 1, 2A-2D, 8A, 8B, 13, and 16, once the pins are locked in place, the reconfigurable mold is transitioned back to the open configuration by the plate actuator 140, as indicated by block 810 in FIG. 16. At this time, the article within the reconfigurable mold is removed. Once the article is removed, images of the molding surface defined by the plurality of pins 614 of the first alternative plate 610 and the molding surface 120a defined by the second plurality of pins 124 of the second plate 120 are captured by the first camera 138 and the second camera 139, as indicated by block 812 in FIG. 16. Such images are then processed by the controller 132 of the control subsystem 130 to generate a set of coordinates for the plurality of pins 614 of the first alternative plate 610 and the second plurality of pins 124 for the second plate 120, as indicated by block 814 in FIG. 16. Each coordinate includes Boolean (true/false) data indicating whether the pin to which the coordinate corresponds is moved in the first axial direction and a numerical value which indicates the extent to which the pin to which the coordinate corresponds is moved in the first axial direction. The coordinates generated by the controller 132 are then processed locally by the controller 132 to generate output data (e.g., a CAD model file) corresponding to a three-dimensional model of the article inserted into the first alternative molding subsystem, as indicated by block 816 in FIG. 16. The output data can then subsequently be read utilizing three-dimensional modeling software and utilized in additive manufacturing applications (e.g., using a 3D printer) to construct the article inserted into the first alternative molding subsystem. Once the output data is generated, the plurality of pins 614 of the first alternative plate 610 and the second plurality of pins 124 of the second plate 120 can be unlocked, as indicated by block 818 in FIG. 16, and the above process repeated to generate output data corresponding to a digital model of another article.

In another (or second) alternative molding subsystem, the first plate 110 of the reconfigurable mold may be substituted with the second alternative plate 710 described above with reference to FIGS. 9 and 10. In such embodiment, the second alternative molding subsystem can be utilized in conjunction with the resin injection assembly 12 to form another alternative (or second alternative) injection molding system which can be used to mold an article by following a similar routine as that of molding routine described above with reference to FIG. 14, except by mapping the coordinates for the plurality of pins 714 and moving and locking the plurality of pins 714 in a manner which complies with the operational characteristics of the plurality of actuators 717 of the second alternative plate 710 described above. That is, instead of EMF values corresponding to the electrical current which must be applied to the respective wound coils of solenoids, the coordinates for the plurality of pins 714 of the first alternative plate 610 will include information corresponding to the positive airflow rates needed to be applied by the airflow source 717a and arm positions needed to be assumed by the articulable arm 717b of respective actuators o the plurality of actuators 717 of the second alternative plate 710 in order to position the plurality of pins 714 in a desired position in the first axial direction.

Further, instead of applying current to select wound coils of solenoids, the plurality of pins 614 will be moved by virtue of the airflow sources 717a of the plurality of actuators 717 emitting a flow of positive of air consistent with such airflow rates and the articulable arms 717b of the plurality of actuators 717 assuming such positions. In some embodiments, zeroing verification of the plurality of pins 714 may be based exclusively on images obtained by the first camera 138 of the molding surface defined by the plurality of pins 714. Furthermore, in such embodiments, instead of the use of a dedicated locking mechanism to hold the plurality of pins 714 in the desired position in the first axial direction, the plurality of pins 714 may be held in a fixed position by virtue of the articulable arms 717b of the plurality of actuators 717 being placed in closed configuration once the plurality of pins 714 are in the desired position. Accordingly, in some embodiments, the second alternative molding subsystem will include each of the components of the molding subsystem 100 described above with reference to FIGS. 1 and 2A-2D, except for the first plate 110 and the locking mechanism 116, 118 for the first plate 110.

In addition to being utilized in combination with the resin injection assembly 12 to mold desired articles, the second alternative molding subsystem can also be utilized to generate output data corresponding to a digital model of an article placed therein. In this regard, the steps of the alternative imprinting routine described above with reference to FIG. 16 can be similarly followed using the second alternative molding subsystem, except that the plurality of pins 714 of the second alternative plate 710 are moved, to the max position or otherwise, via activation of the plurality of actuators 717 in the manner described above with reference to FIGS. 8A and 8B.

Additional, alternative molding subsystem embodiments, in which the locking mechanism 116, 118 for the first plate 110 and/or the locking mechanism 126, 128 for the second plate 120 described above with reference to FIGS. 1, 2A-2D, 4A, and 4B is substituted for a locking mechanism of differing construction, are also contemplated herein.

Figure 6A:
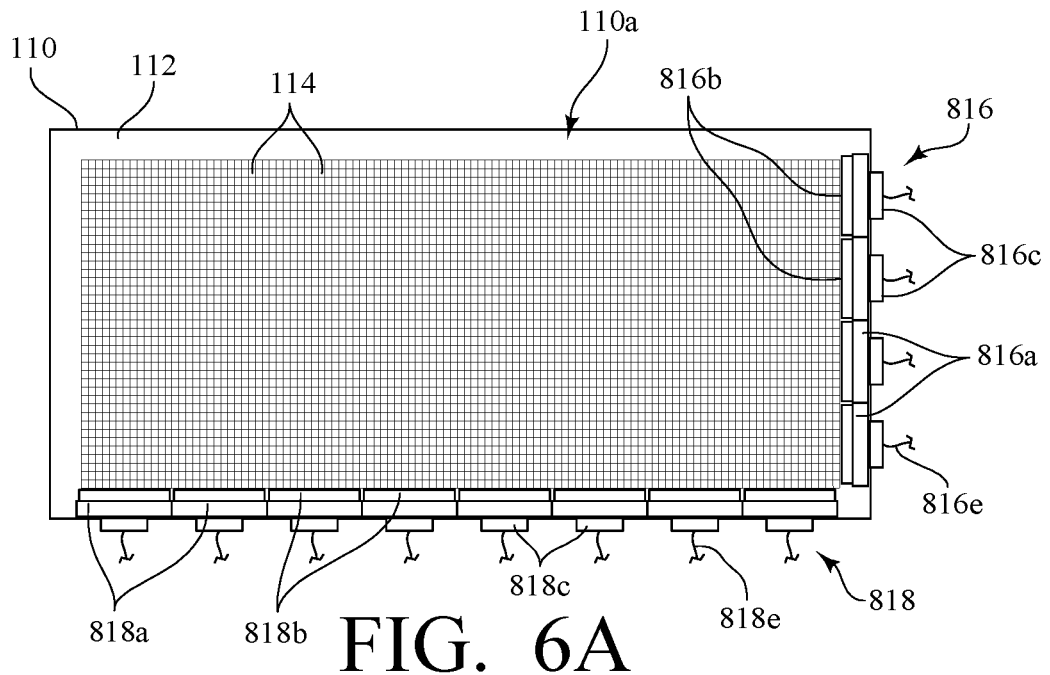
FIG. 6A is a top view of the first plate of the exemplary molding subsystem of FIG. 1 and a first alternative locking mechanism.
Figure 6B:
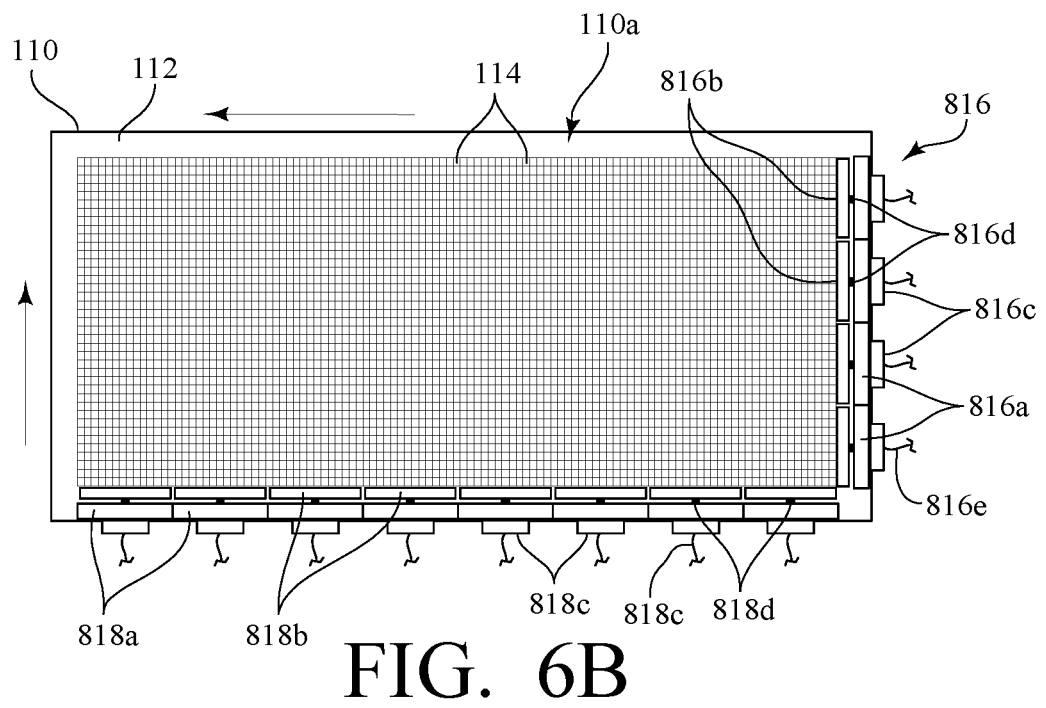
FIG. 6B is another top view of the first plate of the exemplary molding subsystem of FIG. 1 and the first alternative locking mechanism similar to FIG. 6A, but with the pins of the first plate and the first alternative locking mechanism in a locked configuration.

FIGS. 6A and 6B are top views of the first plate 110 described above with reference to FIGS. 1, 2A-2D, 3A, 3B, 4A, 4B, and 5 and a first alternative locking mechanism 816, 818 which may be used therewith.

As evidenced by viewing FIGS. 6A and 6B in sequence, like the locking mechanism 116, 118 for the first plate 110 described above with reference to FIGS. 1, 2A-2D, 4A, and 4B, the first alternative locking mechanism 816, 818 can also be used to move the first plurality of pins 114 in the second axial direction and/or the third axial direction and hold the first plurality of pins 114 in a fixed position. That is, the first alternative locking mechanism 816, 818 can be selectively activated between an unlocked configuration (FIG. 6A) and a locked configuration (FIG. 6B). In use, as the first alternative locking mechanism 816, 818 transitions from the unlocked configuration to the locked configuration, the first plurality of pins 114 are pushed in the in the second axial direction and the third axial direction as, as evidenced by the arrows in FIG. 6B. In this exemplary embodiment, the first alternative locking mechanism 816, 818 actually includes two locking mechanisms: a first locking mechanism 816 configured to move the first plurality of pins 114 in the second axial direction; and a second locking mechanism 818 configured to move the first plurality of pins 114 in the third axial direction.

Referring now to FIGS. 6A, 6B, and 13, as shown, in this embodiment, the first locking mechanism 816 includes a plurality of linearly arranged individual locking mechanisms, which, in this case there are four. Each individual locking mechanism of the first locking mechanism 816, corresponds to, and can be selectively activated to move and lock, a different subset of pins of the first plurality of pins 114 in the second axial direction. As a result, one subset of pins within the first plurality of pins 114 can be individually moved in the second axial direction and locked without also moving pins outside of that subset in the second axial direction. Each individual locking mechanism of the first locking mechanism 816 of the first alternative locking mechanism 816, 818 is of the same construction as the first locking mechanism 116 described above with reference to FIGS. 2A-2D, 4A, and 4B, except that instead of a manually operated handle, each individual locking mechanism is motor driven. In this regard, each individual locking mechanism of the of the first locking mechanism 816 includes: a base 816a that is mounted to the first frame 112; a brace bar 816b configured to engage a first row of the subset of pins of the first plurality of pins 114 adjacently positioned to the brace bar 816b; a motor 816c, and a shaft 816d which is driven by the motor 816c to adjust the positioning of the brace bar 816b relative to the subset of pins to which the brace bar 816b corresponds. The motor 816c of each respective locking mechanism of the first locking mechanism 816 is operably connected to the controller 132 of the control subsystem 130, such that the controller 132 can communicate instructions (signals) which selectively activate the motor 816c to move brace bar 816b toward or away from the subset of pins to which it corresponds.

Referring still to FIGS. 6A, 6B, and 13, the second locking mechanism 818 of the first alternative locking mechanism 816, 818 is of identical construction, is operably connected, and functions in the same manner as the first locking mechanism 816, except that the second locking mechanism 818 can be activated to move the first plurality of pins 114 in the third axial direction. In this regard, like the first locking mechanism 816, the second locking mechanism 818 includes a plurality of linearly arranged individual locking mechanisms, which, in this embodiment, there are eight. Each respective locking mechanism of the second locking mechanism 818 corresponds to, and can be selectively activated to move and lock, a different subset of pins of the first plurality of pins 114 in the third axial direction. As a result, one subset of pins within the first plurality of pins 114 can be individually moved in the third axial direction and locked without also moving pins outside of that subset in the third axial direction. Each individual locking mechanism of the second locking mechanism 818 includes: a base 818a, a brace bar 818b, a motor 818c that is operably connected to the controller 132, and a shaft 818d.

Referring now again specifically to FIGS. 6A and 6B, as the individual locking mechanisms of the first locking mechanism 816 and the second locking mechanism 818 can be activated independently of each other, discrete subsets of pins in the first plurality of pins 114 can be moved and locked in the second axial direction and/or third axial direction at different times. Accordingly, in some embodiments and implementations, the controller 132 may be provided with system software which includes molding routines that involve iteratively moving subsections of pins in the first axial direction and locking subsections of pins in the second and/or third axial direction to limit the total number of actuators which must be activated at a single time and reduce the energy demands of the molding subsystem. In such embodiments and implementations, the pins in one subsection of pins are moved, if needed, in the first axial direction via activation of the actuators corresponding thereto, the first locking mechanism 816 and/or second locking mechanism 818 corresponding to the subsection of pins is then activated to lock the pins in the subsection in place, and the actuators corresponding to the pins in the subsection are deactivated. At this point, the foregoing steps are carried out for another subsection of pins of the first plurality of pins 114. The process repeats itself until all pins in the first plurality of pins 114 are locked in position and all of the actuators are deactivated. In addition to reducing the overall power requirements of the molding subsystem, the foregoing routine may also serve to reduce the deterioration speeds of the actuators used in connection with the first plurality of pins 114.

Although discussed primarily herein in the context of being utilized with the first plate 110, it is appreciated that the first alternative locking mechanism 816, 818 can additionally or alternatively be utilized with the second plate 120 described above with reference to FIGS. 1 and 2A-2D. That is, in some embodiments, the locking mechanism 126, 128 for the second plate 120 described above with reference to FIGS. 1 and 2A-2D may be substituted for the first alternative locking mechanism 816, 818 described above with reference to FIGS. 6A and 6B. It is also appreciated that, in such embodiments, the controller 132 may be provided with system software including molding routines that cause the second plurality of pins 124 to be iteratively moved and locked into place by the first alternative locking mechanism 816, 818 in the same manner as described above for the first plurality of pins 114 of the first plate 110.

Figure 7A:
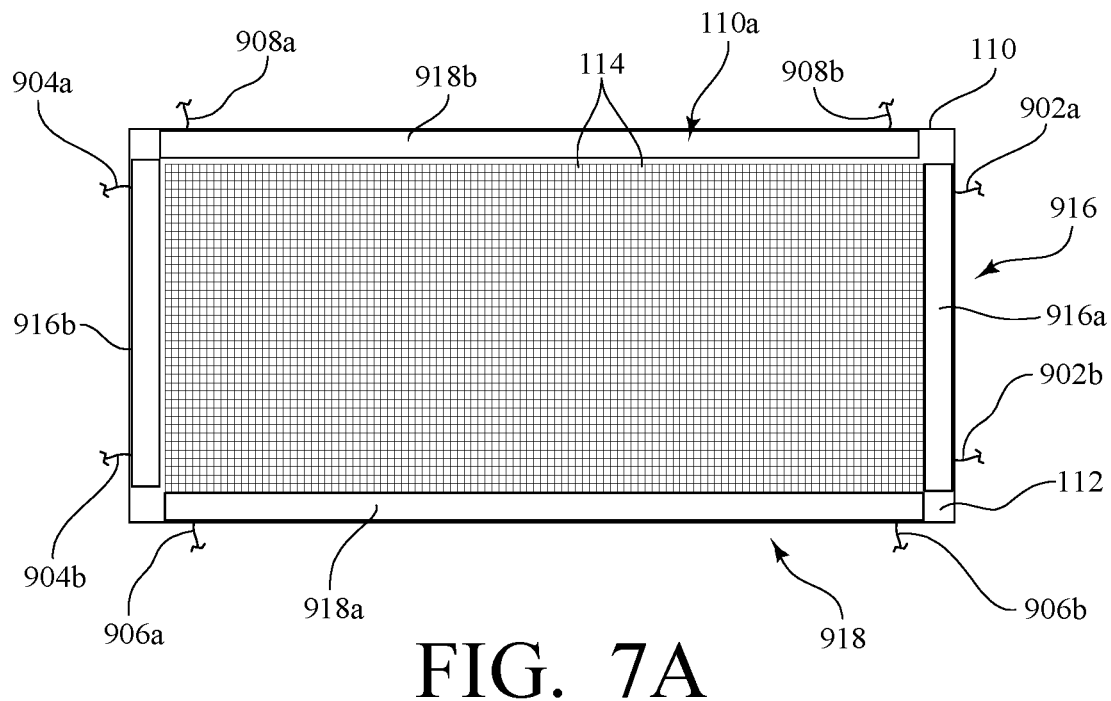
FIG. 7A is a top view of the first plate of the exemplary molding subsystem of FIG. 1 and a second alternative locking mechanism.
Figure 7B:
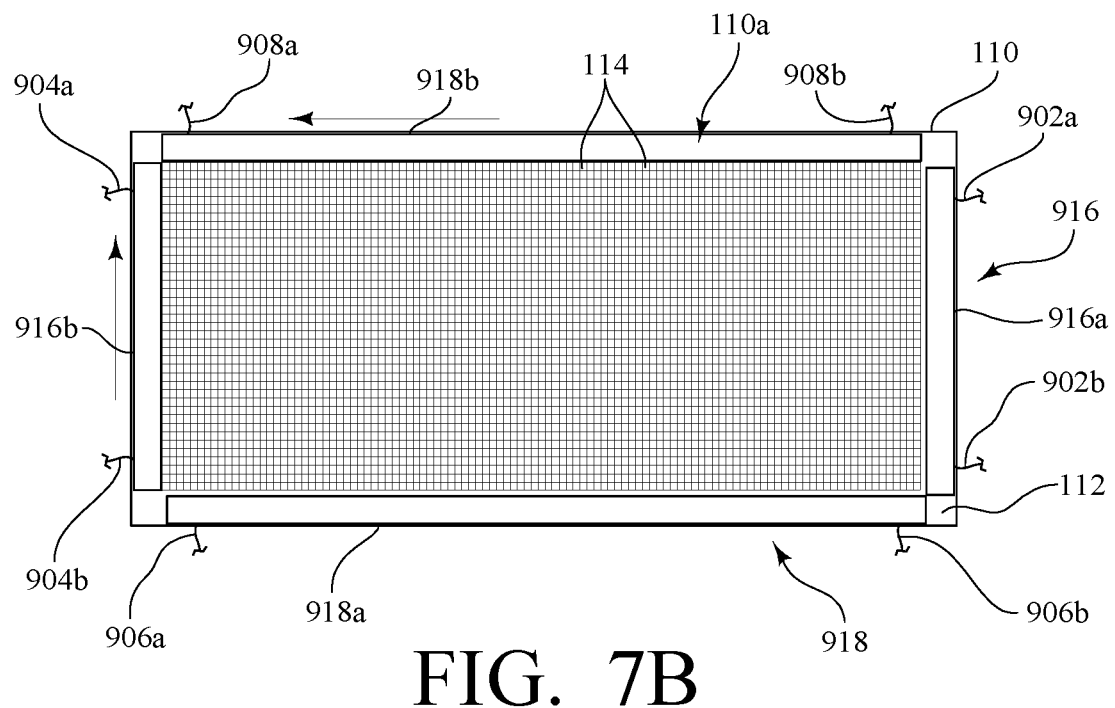
FIG. 7B is another top view of the first plate of the exemplary molding subsystem of FIG. 1 and the second alternative locking mechanism similar to FIG. 7A, but with the pins of the first plate and the second alternative locking mechanism in a locked configuration.

FIGS. 7A and 7B are top views of a the first plate 110 described above with reference to FIGS. 1, 2A-2D, 3A, 3B, 4A, 4B, and 5 and a second alternative locking mechanism 916, 918 which may be used therewith.

As evidenced by viewing FIGS. 7A and 7B in sequence, like the locking mechanism 116, 118 for the first plate 110 described above with reference to FIGS. 1, 2A-2D, 4A, and 4B, the second alternative locking mechanism 916, 918 can also be used to move the first plurality of pins 114 in the second axial direction and/or the third axial direction and hold the first plurality of pins 114 in a fixed position. That is, the second alternative locking mechanism 916, 918 can be selectively activated between an unlocked configuration (FIG. 7A) and a locked configuration (FIG. 7B). In use, as the second alternative locking mechanism 916, 918 transitions from the unlocked configuration to the locked configuration, the first plurality of pins 114 are pushed in the in the second axial direction and the third axial direction as, as evidenced by the arrows in FIG. 7B. In this exemplary embodiment, the second alternative locking mechanism 916, 918 actually includes two locking mechanisms: a first locking mechanism 916 configured to move the first plurality of pins 114 in the second axial direction; and a second locking mechanism 918 configured to move the first plurality of pins 114 in the third axial direction.

Referring now to FIGS. 5, 7A, 7B, and 13, the second alternative locking mechanism 916, 918 can be selectively activated to produce a magnetic field which causes the first plurality of pins to be repositioned in the second axial direction and/or the third axial direction and locked in a fixed position. To this end, the first locking mechanism includes: a first pair of magnetizable bars (or electromagnets) 916a, 916b, which are mounted to a top surface of the first frame 112 on opposing ends of the first frame 112 and extend in the third axial direction; and a second pair of magnetizeable bars (or electromagnets) 918a, 918b, which are mounted to a top surface of the first frame 112 on opposing sides of the first frame 112 and extend in the second axial direction. Each respective electromagnet of the first pair of electromagnets 916a, 916b is operably connected to the controller 132 of the control subsystem via a pair of electrical leads 902a, 902b, 904a, 904b, such that the controller 132 can communicate instructions which cause electrical current to be supplied to the electromagnet to activate and cause the electromagnet to produce a magnetic field. Similarly, each respective electromagnet of the second pair of electromagnets 918a, 918b is operably connected to the controller 132 of the control subsystem via a pair of electrical leads 906a, 906b, 908a, 908b, such that the controller 132 can communicate instructions which cause electrical current to be supplied to the electromagnet to activate and cause the electromagnet to produce a magnetic field. In molding subsystem embodiments employing the second alternative locking mechanism 916, 918, the base 114a of each respective pin of at least the outermost rows of the first plurality of pins 114 extends into the head 114b of the pin and is magnetic, as shown best in FIG. 5.

Referring now specifically to FIGS. 7A and 7B, in this exemplary embodiment, the positioning and polarity of at least the outermost rows of first plurality of pins 114 relative to the magnetic field generated by the respective electromagnets of the first pair of electromagnets 916a, 916b or the second pair of electromagnets 918a, 918b is such that each respective electromagnet of the first pair of electromagnets 916a, 916b can be activated to push the first plurality of pins 114 in the second axial direction and each respective electromagnet of the second pair of electromagnets 918a, 918b can be activated to push the first plurality of pins 114 in the third axial direction. For example, as evidenced by viewing FIGS. 7A and 7B in sequence, in this embodiment, when a first electromagnet 916a of the first pair of electromagnets 916a, 916b and a first electromagnet 918a of the second pair of electromagnets 918a, 918b are activated, the magnetic fields generated thereby push the first plurality of pins 114 to the left in the second axial direction and upward in the third axial direction, as evidenced by the arrows in FIG. 7B. Conversely, when a second electromagnet 916b of the first pair of electromagnets 916a, 916b and a second electromagnet 918b of the second pair of electromagnets 918a, 918b is activated, the magnetic fields generated thereby push the first plurality of pins 114 to the right in the second axial direction and downward in the third axial direction, as evidenced by viewing FIGS. 7A and 7B in reverse sequence. Furthermore, in this exemplary embodiment, the first pair of electromagnets 916a, 916b can be activated simultaneously to hold the first plurality of pins 114 in a fixed position within the first plurality of channels 113 without moving the first plurality of pins 114 any further to the left or the right in the second axial direction than they were positioned at the time such simultaneous activation occurred. That is the translational movement imparted on the first plurality of pins 114 by the first electromagnet 916a and the second electromagnet 916b of the first pair of electromagnets 916a, 916b effectively cancel each other out. Similarly, the second pair of electromagnets 918a, 918b can be activated simultaneously to hold the first plurality of pins 114 in a fixed position within the first plurality of channels 113 without moving the first plurality of pins 114 any further upward or downward in the third axial direction than they were positioned at the time such simultaneous activation occurred. That is the translational movement imparted on the first plurality of pins 114 by the first electromagnet 918a and the second electromagnet 918b of the second pair of electromagnets 918a, 918b effectively cancel each other out. Each individual electromagnet of the first pair of electromagnets 916 a, 916b and each individual electromagnet of the second pair of electromagnets 918a, 918b can also be operated independently of the other electromagnets, such that the first plurality of pins 114 can be pushed in one of the second axial direction and the third axial direction without also being moved in the other of the second axial direction and the third axial direction. Of course, the positioning and polarity of the outermost rows of the first plurality of pins 114 and/or the polarity of the respective electromagnets could be modified so that, instead of a pushing force, one or more of the electromagnets, when activated, generate a magnetic field which pulls the pins in the axial direction to which such electromagnet(s) correspond.

Although illustrated and primarily referred to herein as being mounted to a top surface of the first frame 112, alternative embodiments are contemplated wherein each respective electromagnet of the first pair of electromagnets 916a, 916b and the second pair of electromagnets 918a, 918b is embedded within the interior of the first frame 112. In such embodiments, the second alternative locking mechanism 916, 918 may be used in conjunction with one of the other locking mechanisms described herein.

Although discussed primarily herein in the context of being utilized with the first plate 110, it is appreciated that the second alternative locking mechanism 916, 918 can additionally or alternatively be utilized with the second plate 120 described above with reference to FIGS. 1 and 2A-2D.

That is, in some embodiments, the locking mechanism 126, 128 for the second plate 120 described above with reference to FIGS. 1 and 2A-2D may be substituted for the second alternative locking mechanism 916, 918 described above with reference to FIGS. 7A and 7B.

Although, the reconfigurable mold of the molding subsystems disclosed herein are are primarily described as including two plates it should be appreciated that, in alternative embodiments, the reconfigurable mold may include fewer or additional plates without departing from the spirit or scope of the present invention. As such, embodiments in which the reconfigurable mold of the molding subsystem includes only a single plate consistent with one of the plates 110, 120, 610, 710 described herein as well as embodiments in which the reconfigurable mold of the molding subsystem includes more than two plates that are of identical construction to one or more of the plates 110, 120 610, 710 described herein are also contemplated. Accordingly, in embodiments in which the reconfigurable mold of the molding subsystem includes only a single plate, it should be appreciated that the molding and imprinting routines described above with reference to FIGS. 14, 15, and 16 can still be carried out, except that the operations relating to the mapping of coordinates corresponding to, the generation of coordinates derived from, the movement of, or the locking of the second plate, as well as opening and closing of the reconfigurable mold, would not be applicable in such embodiments. Furthermore, in embodiments in which the reconfigurable mold of the molding subsystem includes more than two plates, it should be appreciated that the molding and imprinting routines described above with reference to FIGS. 14, 15, and 16 can still be carried out, except that operations relating to the mapping of coordinates for, the generation of coordinates derived from, the movement of, or the locking of the first plate and the second plate would be similarly applied for each additional plate in the reconfigurable mold. In such embodiments, opening and closing of the reconfigurable mold would, of course, involve each additional plate.

It is appreciated that various steps indicated by the blocks and decisions of the routines described above with reference to FIGS. 14-16 can occur at other points in such routines than as illustrated in such figures, except where context precludes otherwise.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A molding subsystem, comprising:
a reconfigurable mold, including
one or more plates, with each plate of the one or more plates including
a plurality of pins defining a molding surface,
a frame defining a plurality of channels for receiving the plurality of pins, and
a plurality of actuators, wherein each actuator of the plurality of actuators corresponds to at least one pin of the plurality of pins and can be selectively activated to move the at least one pin in a first axial direction to affect the shape of the molding surface;
a control subsystem, including
a controller operably connected to the plurality of actuators of each plate of the one or more plates, the controller including a processor for executing instructions stored in a memory component to (i) receive and process input data corresponding to a digital model of an article intended for manufacture and (ii) communicate instructions which activate select actuators of the plurality of actuators of each plate of the one or more plates based on the input data; and
a locking mechanism for each plate of the one or more plates, wherein the locking mechanism of each plate can be selectively activated to move the plurality of pins of the plate in at least one of a second axial direction and a third axial direction and to hold the plurality of pins in a fixed position within the plurality of channels;
wherein the second axial direction and the third axial direction are perpendicular to each other and to the first axial direction.

2. The molding subsystem according to claim 1, wherein a base of each pin of the plurality of pins is received in one of the plurality of channels, the base of each pin having a diameter which is smaller than a diameter of the channel in which the pin is received, such that the pin can be repositioned within the channel in at least one of the second axial direction and the third axial direction in response to the locking mechanism being activated, and wherein a head of each pin of the plurality of pins is in contact with the head of at least one other pin of the plurality of pins.

3. The molding subsystem according to claim 1, wherein a base of each pin of the plurality of pins is received in one of the plurality of channels, the base of each pin having a diameter which is smaller than a diameter of the channel in which the pin is received, such that the pin can be repositioned within the channel in the second axial direction and the third axial direction in response to the locking mechanism being activated, and wherein a head of each pin of the plurality of pins is in contact with the head of at least two other pins of the plurality of pins.

4. The molding subsystem according to claim 3, wherein the locking mechanism for each plate of the one or more plates includes a first locking mechanism which can be selectively activated to move the plurality of pins of the plate in the second axial direction and a second locking mechanism which can be selectively activated to move the plurality of pins of the plate in a third axial direction.

5. The molding subsystem according to claim 4, wherein the first locking mechanism includes a first bar positioned adjacent to a first row of pins of the plurality of pins and configured to be driven in the second axial direction in response to rotation of a first shaft, and the second locking mechanism includes a second bar positioned adjacent to a second row of pins of the plurality of pins and configured to be driven in the third axial direction in response to rotation of a second shaft.

6. The molding subsystem according to claim 5, wherein the first locking mechanism includes a first motor which can be selectively activated to rotate the first shaft, wherein the second locking mechanism includes a second motor which can be selectively activated to rotate the second shaft, and wherein the first motor and the second motor are operably connected to the controller, and the processor is configured to execute instructions stored in the memory component to activate the first motor and the second motor.

7. The molding subsystem according to claim 4, wherein the first locking mechanism includes a first set of bars configured to be driven in the second axial direction in response to rotation of a first set of shafts, each bar of the first set of bars being positioned adjacent to a subset of pins within a first row of pins of the plurality of pins, and wherein the second locking mechanism includes a second set of bars configured to be driven in the third axial direction in response to rotation of a second set of shafts, each bar of the first set of bars being positioned adjacent to a subset of pins within a second row of pins of the plurality of pins.

8. The molding subsystem according to claim 4, wherein the first locking mechanism includes a first electromagnet positioned adjacent to a first row of pins of the plurality of pins and configured to be selectively activated to generate an electromagnetic field to move the first row of pins in the second axial direction, and the second locking mechanism includes a second electromagnet positioned adjacent to a second row of pins of the plurality of pins and configured to be selectively activated to generate an electromagnetic field to move the second row of pins in the third axial direction, and wherein the first electromagnet and the second electromagnet are operably connected to the controller, and the processer is configured to execute instructions stored in the memory component to (iii) communicate instructions which activate the first electromagnet and (iv) communicate instructions which activate the second electromagnet.

9. The molding subsystem according to claim 1, wherein the one or more plates includes a first plate and a second plate, and wherein the molding subsystem further comprises:
a framework for supporting the first plate and the second plate opposite of each other, the framework including a guide rail to which at least one of the first plate and the second plate is mounted for travel.

10. The molding subsystem according to claim 9, and further comprising:
a plate actuator operably connected to the controller and mounted to at least one of the first plate and the second plate, wherein the processor is configured to execute instructions stored in the memory component to (iii) communicate instructions which cause the plate actuator to move the first plate and the second plate toward each other and (iv) communicate instructions which cause the plate actuator to move the first plate and the second plate away from each other.

11. The molding subsystem according to claim 9, and further comprising:
a first membrane dispensing assembly configured to dispense a first flexible membrane configured to cover the molding surface of the first plate, the first membrane dispensing assembly including a first pair of motorized spools for dispensing the first flexible membrane; and
a second membrane dispensing assembly configured to dispense a second flexible membrane configured to cover the molding surface of the second plate, the second membrane dispensing assembly including a second pair of motorized spools for dispensing the second flexible membrane;
wherein the first pair of motorized spools and the second pair of motorized spools are operably connected to the controller, and the processor is configured to execute instructions stored in the memory component to (iii) communicate instructions which drive rotation of the first pair of motorized spools and (iv) communicate instructions which drive rotation of the second pair of motorized spools.

12. The molding subsystem according to claim 1, wherein the processor is configured to execute instructions stored in the memory component to (iii) receive and process readings from the plurality of actuators of each plate of the one or more plates corresponding to the positioning of the plurality of pins in the first axial direction and (iv) generate, based on the readings from the plurality of actuators of each plate of the one or more plates, output data corresponding to a digital model of an article with surfaces corresponding to the molding surface of the each plate of the one or more plates.

13. The molding subsystem according to claim 1, wherein the processor is configured to execute instructions stored in the memory component to (iii) convert the input data to a converted file using a mesh model based on the input data and a pin model, the converted file including data associating surfaces of the article intended for manufacture reflected in the input data with the plurality of pins of each plate of the one or more plates and indicating the extent to which select pins of the plurality of pins of each plate of the one or more plates are to be moved in the first axial direction, and
wherein the controller communicates instructions which activate select actuators of the plurality of actuators of each plate based on the data included in the converted file.

14. The molding subsystem according to claim 1, wherein each actuator of the plurality of actuators is an electromagnetic actuator and a base of each pin of the plurality of pins is constructed of a magnetic material.

15. The molding subsystem according to claim 14, wherein each actuator of the plurality of actuators is a solenoid including one or more wound coils, wherein each wound coil of the one or more wound coils is configured to receive the base of one of the plurality of pins and to receive an electrical current to move the one of the plurality of pins in the first axial direction.

16. The molding subsystem according to claim 15, wherein the frame includes multiple platforms which collectively define the plurality of channels, and wherein the solenoid includes multiple wound coils attached to different platforms of the frame.

* * * * *